US009319245B2

(12) United States Patent
Koike et al.

(10) Patent No.: US 9,319,245 B2
(45) Date of Patent: Apr. 19, 2016

(54) INFORMATION PROCESSING DEVICE, RECORDING MEDIUM STORING INFORMATION SEARCH PROGRAM, AND INFORMATION SEARCH METHOD

(71) Applicant: FUJITSU LIMITED, Kawasaki-shi, Kanagawa (JP)

(72) Inventors: Yasuo Koike, Numazu (JP); Kazuhisa Fujita, Shizuoka (JP); Toshiyuki Maeda, Shimizu (JP); Akira Ochi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 14/105,656

(22) Filed: Dec. 13, 2013

(65) Prior Publication Data

US 2014/0188833 A1    Jul. 3, 2014

(30) Foreign Application Priority Data

Dec. 28, 2012 (JP) ................................. 2012-288855

(51) Int. Cl.
*G06F 17/30* (2006.01)
*G06F 7/00* (2006.01)
*H04L 12/64* (2006.01)

(52) U.S. Cl.
CPC ................................. *H04L 12/6418* (2013.01)

(58) Field of Classification Search
None
See application file for complete search history.

(56) References Cited

U.S. PATENT DOCUMENTS 7,418,454 B2 *  8/2008  Chen et al.
8,582,469 B2 * 11/2013  Rosenberg .................... 370/254
8,675,672 B1 *  3/2014  Bao et al. ...................... 370/408
8,849,825 B1 *  9/2014  McHugh et al. .............. 707/737
2008/0144636 A1    6/2008  Ushiyama et al.
2011/0153737 A1    6/2011  Chu et al. ...................... 709/204
2013/0263151 A1 * 10/2013  Li et al. ......................... 718/105
2014/0310418 A1 * 10/2014  Sorenson et al. ............. 709/226

FOREIGN PATENT DOCUMENTS

JP    2007-53662     3/2007
JP    2007-156700    6/2007

OTHER PUBLICATIONS

L. R. Monnerat et al., "D1HT: A Distributed One Hop Hash Table (Extended Version)(Technical Report ES-705/06, COPPE/UFRJ)" *20th IEEE International Parallel and Distributed Processing Symposium (IPDPS)*, Apr. 2006, pp. 1-18.

* cited by examiner

*Primary Examiner* — Jeffrey A Burke
(74) *Attorney, Agent, or Firm* — Staas & Halsey LLP

(57) ABSTRACT

An information processing device having any of hash values associated with a hash space based on distribution hash information. The device acquires access information to an information processing device as a target, the access information being transmitted from another information processing device on the basis of first distribution hash information using the hash value in the hash space between first devices belonging to one of groups divided according to a sequence in terms of the magnitudes of the hash values associated with the hash space, stores second distribution hash information using the hash value in the hash space pertaining to a second device belonging to the group to which the first device belongs, searches second distribution hash information for a second device corresponding to the hash value generated from the access information, and transmits access information to the retrieved second device by the searching.

5 Claims, 20 Drawing Sheets

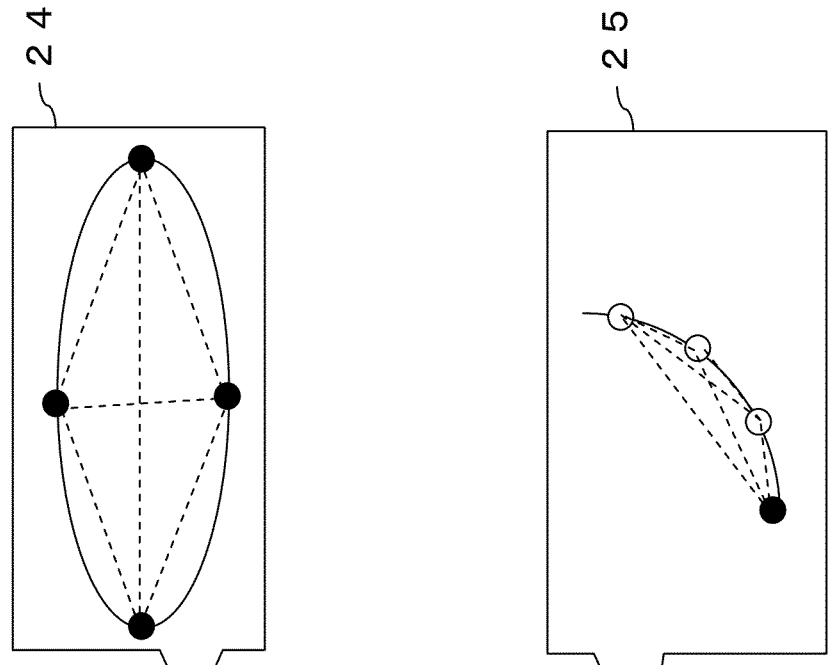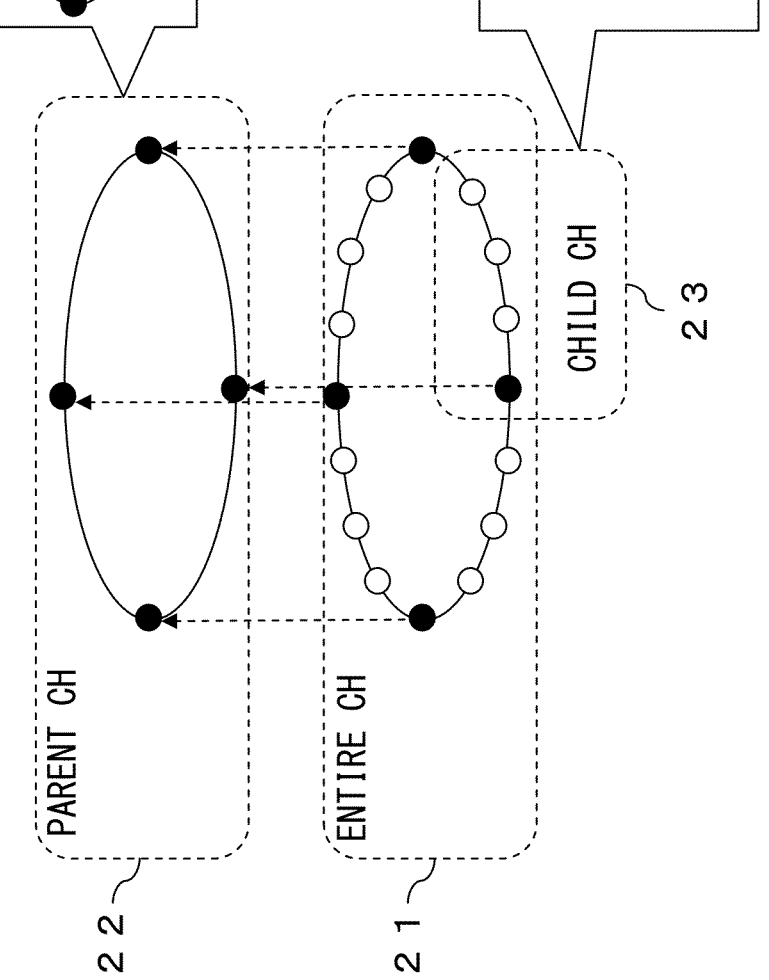
FIG. 3

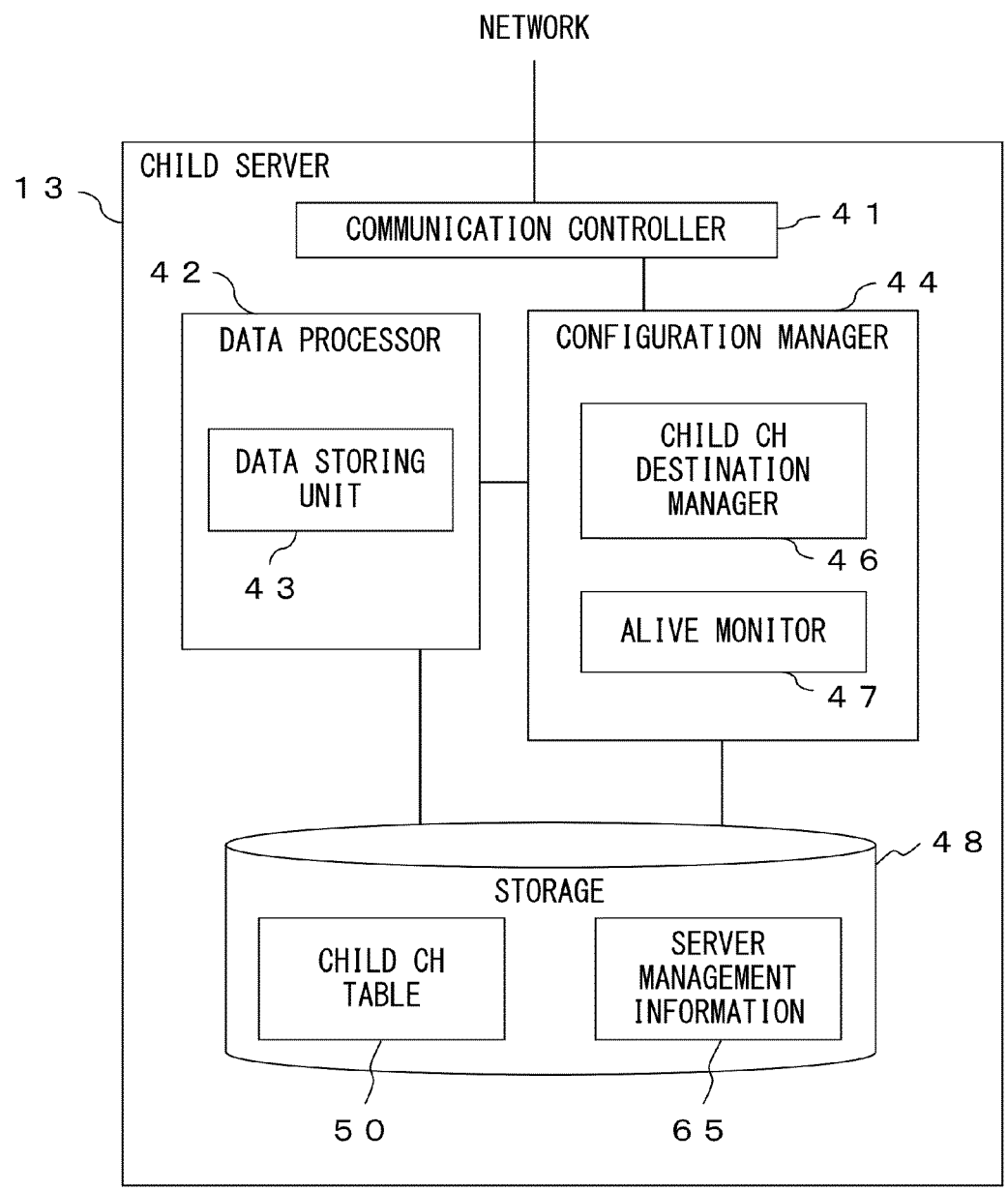
F I G. 7

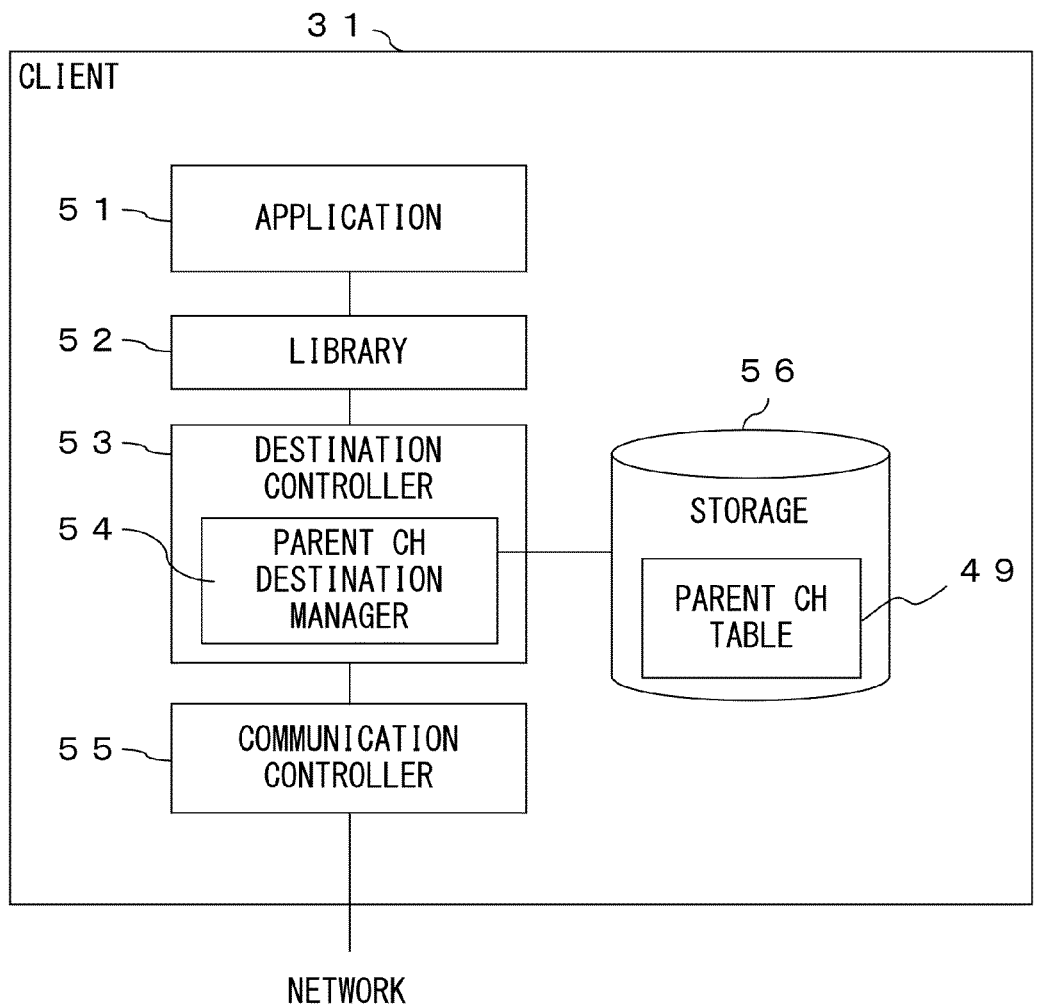
F I G. 8

FIG. 11A

SERVER INFORMATION STRUCTURE

| SERVER IDENTIFIER | HASH VALUE | DESTINATION INFORMATION | ADDRESS INFORMATION 1 | ADDRESS INFORMATION 2 |
|---|---|---|---|---|
| 72 | 73 | 74 | 75 | 76 |

EXAMPLE OF SERVER INFORMATION

| Server-A | 0x0B1F2E | 10.100.100.100 | 0xA0000010 | 0xA0000020 |
|---|---|---|---|---|

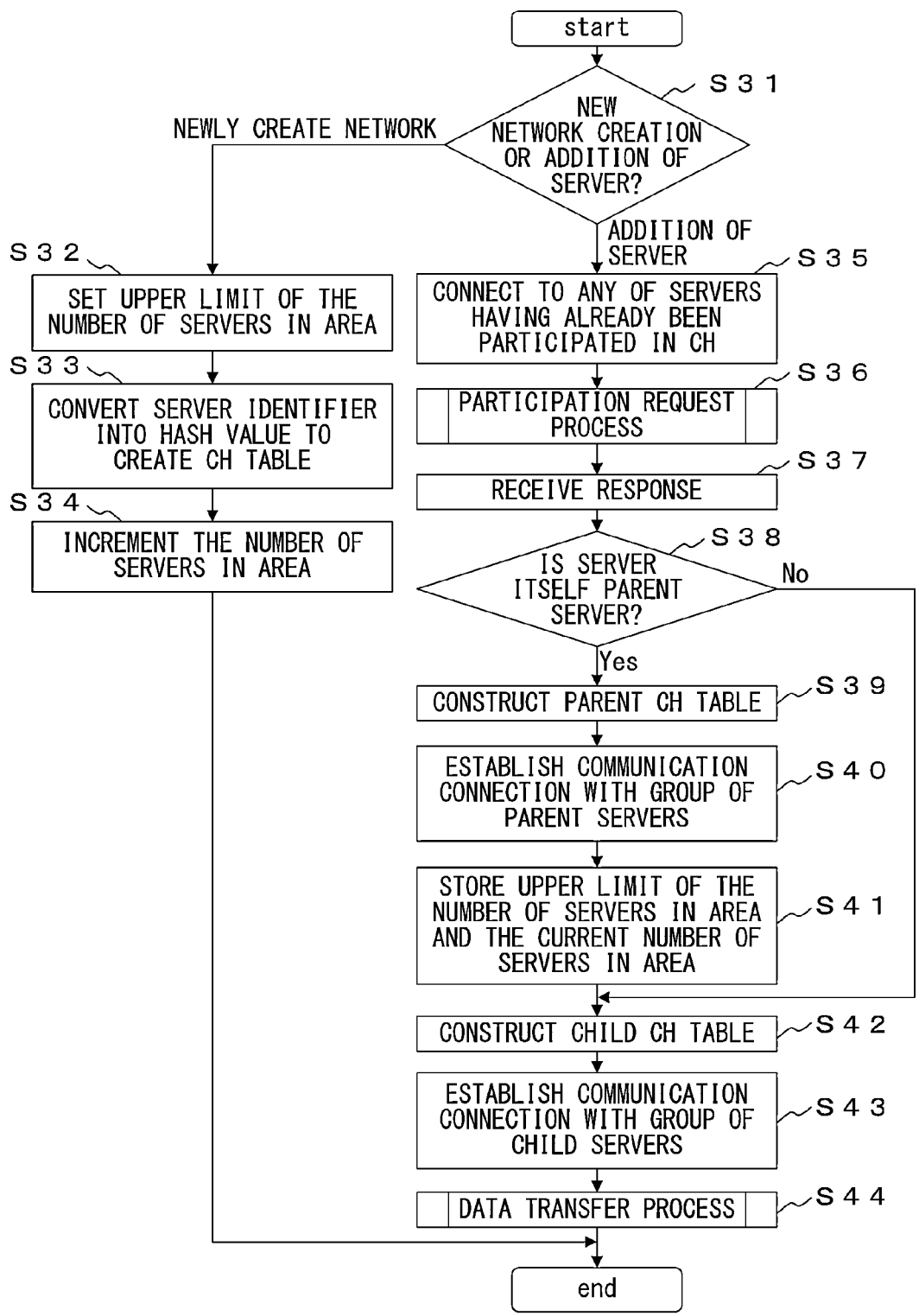
F I G. 1 6

INFORMATION PROCESSING DEVICE, RECORDING MEDIUM STORING INFORMATION SEARCH PROGRAM, AND INFORMATION SEARCH METHOD

CROSS-REFERENCE TO RELATED APPLICATION

This application is based upon and claims the benefit of priority of the prior Japanese Patent Application No. 2012-288855, filed on Dec. 28, 2012, the entire contents of which are incorporated herein by reference.

FIELD

The present invention relates to information searching technologies of information processing devices.

BACKGROUND

A system where computers are distributed (distributed system) needs destination information of a server, which is a communication destination (e.g., internet protocol (IP) address etc.). Types of methods of managing destinations in distributed systems are, for instance, a central management type, and a peer-to-peer (P2P) type. In the central management type management method, first, a client accesses a dedicated server that manages destinations, and identifies a target server as a destination from the dedicated server. In contrast, in the P2P type management method, each server in a distributed system manages destination information for the other servers (all the servers have functions of management servers).

In a P2P type distributed system, it is preferred to determine a server to which data is to be assigned, by means of calculation, in order to make relationship between servers loose. For this type, a distributed hash table (DHT) is often used. According to the distributed hash table, nodes are mapped into a hash space, which is a set of hash values determined by a prescribed hash function, thereby constructing an overlay network. The method of determining a server as a destination using DHT assigns a key to data, and hashes the key to thereby determine a server to which the data is assigned. It is anticipated that use of DHT allows the distribution of data to servers to be uniform in terms of probability to make loads be distributed. In particular, a hashing method referred to as consistent hashing (CH) has a strong flexibility in adding and deleting servers on a network. Accordingly, this method is applied to fields of distributed data storage systems and distributed cache systems.

For instance, a technology pertaining to distributed systems using DHT is as follows.

A first technology is an information communication system that reduces loads on a node device that transmits information when transmitting the information to a plurality of node devices. The information communication system is formed by participation of the node devices connected to each other via communication paths. In the information communication system, a certain node device X determines representative node devices included in respective groups which are multiple (four) groups and into which the node devices are classified according to a prescribed rule (e.g., DHT). The node device X transmits main information to the determined node devices A, B and C. When the main information received from another node device is destined to the group including the own node device, the node device X transmits the main information received in an analogous manner to the node device as the representative of the group to which the own node device belongs.

A second technology is the following information search method. The information search method holds service information that includes information representing the location, content and the like of information provided by a terminal device that is a service provider, and information for using this information; this method is applied to an information search system that includes communication devices classified into groups on the basis of prescribed conditions. The information search method includes an attribute information acquisition step, a first search step, a request transferring step, and a second search step. The attribute information acquisition step acquires attribute information for identifying service information included in an information search request that requests search of service information. The first search step searches for a group to which a communication device holding target service information belongs on the basis of the attribute information acquired by the attribute information acquisition step. The request transferring step transfers the information search request to the representative communication device of the group which is the result of the first search step. When the own device is the representative communication device, the second search step receives the information search request transferred by the request transferring step and searches for the target service information in the own group.

Systems such as for online stock transaction needs to quickly process enormous requests. Furthermore, in these days, it is difficult to predict the growth in the amount of requests for online transactions. Accordingly, the systems need to have a mechanism for allowing the processing capacity to be flexibly expanded. In order to meet the demand, a distributed processing system that is dynamically expanded is preferable.

The central management type distributed system has a significantly simple structure, and reaches a target server at two communications. However, a management server may become a single fault point, which affects the entire system in case of occurrence of an abnormality. This system also has a drawback in that query communications may easily become a bottleneck in the case where the number of servers significantly increases.

The P2P type distributed system has an advantage of fault-tolerance even in case where some of servers have failed. This system is often adopted as a large-scale distributed system from which availability is needed. In the case of constructing a DHT type overlay network, load distribution is also expected. That is, the drawback of the central management type is solved.

Note that the techniques disclosed in the following documents are also known.

Patent Document 1: Japanese Laid-Open Patent Publication No. 2007-053662
Patent Document 2: Japanese Patent Laid-Open Publication No. 2007-156700
Non-Patent Document 1: Luiz R. Monnerat and Claudio L. Amorim, "D1HT: A Distributed One Hop Hash Table Extended Version"

SUMMARY

According to an aspect of the embodiments, an information processing device is connected in a manner capable of mutually communicating via a communication network, and has any of hash values associated with a hash space based on distribution hash information providing the hash values according to a distributed hashing method. The information processing device includes a storing unit, and a processor. The processor receives access information of requiring access to the information processing device as a target on the basis of first distribution hash information; the access information has been transmitted from another information processing device. The first distribution hash information represents distribution hash information using the hash value in the hash space between first devices. The first device is any of information processing devices belonging to one of groups divided according to the sequence in terms of the magnitudes of hash values. The processor searches second distribution hash information for a second device corresponding to the hash value generated from access information. The second distribution hash information represents distribution hash information using the hash value in the hash space pertaining to a second device, which is an information processing device belonging to the group to which the first device belongs. The processor transmits the access information to the retrieved second device.

According to another aspect of the embodiments, an information processing terminal is connected to another information processing device in a manner capable of mutually communicating therewith via a communication network, and accesses an information processing system including information processing devices having any of hash values associated with a hash space based on distribution hash information providing the hash values according to the distributed hashing method. The information processing terminal includes a storing unit, and a processor. The storing unit stores representative device distribution hash information. The representative device distribution hash information represents distribution hash information using the hash values in the hash space between representative devices. The representative device is any information processing device belonging to one of groups divided according to the sequence in terms of the magnitudes of hash values associated with the hash space. The processor acquires access information for requesting access to the information processing device as a target. The processor searches the representative device distribution hash information for the representative device corresponding to the hash value generated from the access information. The processor transmits the access information to the retrieved representative device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for illustrating the relationship between a parent server and a child server on CH, and network connection therebetween in this embodiment.

FIG. 7 illustrates an example of the configuration of the child server in this embodiment.

FIG. 8 illustrates an example of a configuration of a client in this embodiment.

FIG. 11A illustrates an example of a server information structure for constructing a parent CH or a child CH in this embodiment.

FIG. 11B illustrates an example of a server information structure in this embodiment.

FIG. 16 illustrates a processing flow executed by a server to be added to the split hash in this embodiment.

DESCRIPTION OF EMBODIMENTS

Figure 1:
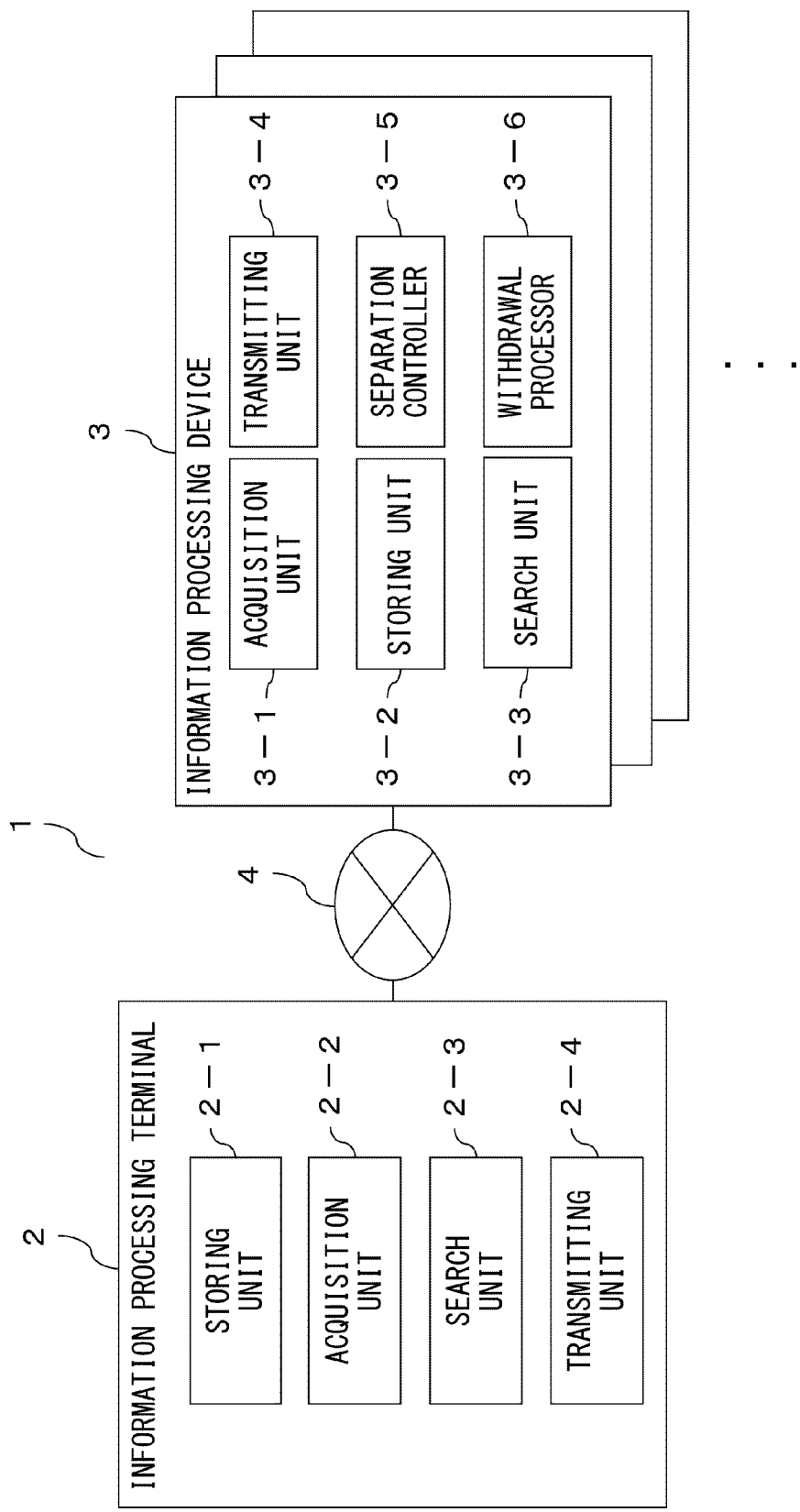
FIG. 1 is a block diagram of an information processing system of an embodiment.

In the P2P type, it is ideal that each of clients and servers know the destination information of all the servers participating in the system. In this case, it is possible that any of clients and servers instantaneously communicate with a target server.

Unfortunately, when the number of servers participating in the system becomes significantly high, the amount of destination information, and connection resources become enormous, which needs high-performance hardware. Furthermore, communication traffic for synchronizing destination information in the case of alive monitoring on servers and change in server configurations increases. Accordingly, communication loads increases.

One aspect of the embodiments discussed herein provides a technology for reducing a load of controlling and maintaining a network, in a system including information processing devices that are capable of communicating with each other.

A speed of reaching a target server and a service cost for destination information have the following trade-off relationship. Accordingly, the way of optimization is the point.

Amount of destination information: Small . . . Large
Reaching speed: Low . . . High
Maintenance cost: Low . . . High An algorithm of constructing an overlay network according to DHT is, for instance, Chord, Pastry, or CAN. Chord is a routing algorithm where a certain number of hops (moving between servers while searching) are performed to reach a destination instead of reducing destination information held by one server. Chord is efficient algorithm also in this field, and reaches a destination at an order of hops of 0(log 2 N) (N is the number of servers), irrespective of the scale of the system.

However, in a system, for instance, a web front system for online stock transaction where improvement in latency (response speed) by omitting even one communication (several hundred microseconds) results in competitiveness, the speed of reaching data and the stability thereof according to Chord is insufficient. In a system, such as a streaming process, which is needed to cause the process to always comply with the slowest case, even Chord is insufficient in speed of reaching data and stability thereof.

More specifically, Chord needs at least two hops at a high probability, irrespective of the number of servers. A configuration with 100 devices needs communication with at least five hops, which sometimes cause a difference in communication performance that is at least one millisecond.

Meanwhile, a method has been being researched that pursues speedup and stability, and reduces the number of hops to the absolute minimum. A method referred to as one hop DHT, such as D1HT, is a method of speeding up search for a DHT. This algorithm causes only one hop in a normal case. However, in these methods, all servers are needed to store paths to the other servers. Accordingly, when the number of servers participating in the system significantly increases, the amount of destination information and connection resources become enormous, which needs high-performance hardware. The communication traffic for synchronizing destination information increases in the case of alive monitoring on the servers and in the case where the server configuration is changed, thereby increasing the communication load. That is, it is an object of a competitive system to construct an overlay network that achieves a lower maintenance cost of the system and an excellent response performance.

According to this embodiment, a method of constructing an overlay network will be proposed that has characteristics of high availability equivalent to that of consistent hashing and flexibly allowing change in configuration, and achieves a low load for maintaining the network and a high response performance.

FIG. 1 is a block diagram of an information processing system in this embodiment. The information search system 1 includes an information processing terminal 2, information processing devices 3, and a communication network 4.

The information processing devices 3 are communicably connected to each other via the communication network 4, and have respective hash values associated with a hash space based on distribution hash information that provides the hash values according to a distributed hashing method. One example of the distribution hash information is a distributed hash table. The information processing device 3 includes an acquisition unit 3-1, a storing unit 3-2, a search unit 3-3, a transmitting unit 3-4, a separation controller 3-5, and a withdrawal processor 3-6.

The acquisition unit 3-1 acquires access information that requests access to a target information processing device 3 and that has been transmitted from another information processing device 3, on the basis of first distribution hash information. An example of the acquisition unit 3-1 is a communication controller 41 descried later. The first distribution hash information represents distribution hash information using hash values in the hash space between first devices. An example of the first distribution hash information is a parent hash table 49 described later. The first device is any of the information processing devices 3 belonging to one of groups divided according to the sequence in terms of the magnitudes of hash values associated with the hash space. An example of the first device is a parent server 12 described later.

The storing unit 3-2 stores the second distribution hash information. The second distribution hash information represents distribution hash information using hash values in the hash space pertaining to the second devices, which are information processing devices belonging to the group to which the first device belongs. An example of the storing unit 3-2 is a storage 48 described later. An example of the second distribution hash information is a child CH table 50 described later.

The search unit 3-3 searches the second distribution hash information for the second device corresponding to the hash value generated from access information. An example of the search unit 3-3 is a child CH destination manager 46 descried later. An example of the second device is a child server 13 described later.

The transmitting unit 3-4 transmits the access information to the retrieved second device by the searching. An example of the transmitting unit 3-4 is a communication controller 41 described later.

This configuration allows the same hash space to be layered, thereby enabling the load of controlling and maintaining the network to be reduced.

In the case where the information processing device is the first device, the storing unit 3-2 stores the first distribution hash information. In the case where the acquired access information is access information to be processed by the first device other than the information processing device concerned, the search unit 3-3 searches the first distribution hash information for the first device corresponding to the hash value generated from the access information. The transmitting unit 3-4 transmits the access information to the retrieved first device.

Furthermore, the information processing device 3 includes the separation controller 3-5. In the case where a participation request to the first group to which the first device belongs is notified from the information processing device 3 belonging to no group, the separation controller 3-5 compares the number of second devices belonging to the first group with a prescribed threshold. The separation controller 3-5 selects any of the second devices on the basis of the comparison result. The separation controller 3-5 separates, from the first group, the second device having the hash value included in a range from a starting point of the hash space corresponding to the first group to the hash value of the selected second device. The separation controller 3-5 generates the second distribution hash information on the group formed by the separated second device, and adds the selected second device to the first distribution hash information. An example of the separation controller 3-5 is a configuration manager 44 described later.

Furthermore, the information processing device 3 includes the withdrawal processor 3-6. In the case where the first device is withdrawn from the communication network 4, when the information processing device 3 has a hash value next higher or lower than that of the withdrawn first device among the second devices belonging to the group to which the withdrawn first device belongs, the withdrawal processor 3-6 performs the following processes. That is, the withdrawal processor 3-6 notifies the other information processing devices 3 that the second device is the renewed first device in the group from which the first device has been withdrawn, while adding the second device to the first distribution hash information and transmitting the information to the other information processing devices 3 or information processing terminals 2. An example of the withdrawal processor 3-6 is the configuration manager 44 described later.

This configuration allows the same hash space to be layered, and thus allows adverse effects of change in the network configuration to be localized, thereby enabling the load of controlling and maintaining the network to be reduced.

The information processing terminal 2 is connected to another information processing device 3 in a manner capable of mutual communication via the communication network 4, and accesses the information processing system including the information processing device having any of the hash values associated with the hash space based on the distribution hash information. The information processing terminal 2 includes a storing unit 2-1, an acquisition unit 2-2, a search unit 2-3, and a transmitting unit 2-4. The storing unit 2-1 stores representative device distribution hash information. The representative device distribution hash information (first distribution hash information) represents distribution hash information using the hash value in the hash space between representative devices (first devices). The representative device (first device) is any of the information processing devices 3 belonging to any of groups divided according to a sequence in terms of magnitudes of hash values associated with the hash space. An example of the storing unit 2-1 is a storage 56 described later.

The acquisition unit 2-2 acquires access information for requesting access to a target information processing device. An example of the acquisition unit 2-2 is a library 52 described later.

The search unit 2-3 searches the representative device distribution hash information for the representative device corresponding to the hash value generated from the access information. An example of the search unit 2-3 is a parent CH destination manager 54 described later.

The transmitting unit 2-4 transmits the access information to the retrieved representative device by the searching. An example of the transmitting unit 2-4 is a communication controller 55 described later.

This configuration allows the same hash space to be layered, thereby enabling the load of controlling and maintaining the network to be reduced.

According to this embodiment, first, in the overlay network using the consistent hashing (CH), the hash space is divided into multiple pieces according to the number of servers. Hereinafter, the divided hash space is referred to as "areas". Next, the parent servers are automatically selected from the respective areas. Control is performed such that access to any of servers in each area is made via the parent server. In doing so, the single hash space is dealt with as a layered structure. The divided and layered hash space is referred to as a split hash.

Figure 2:
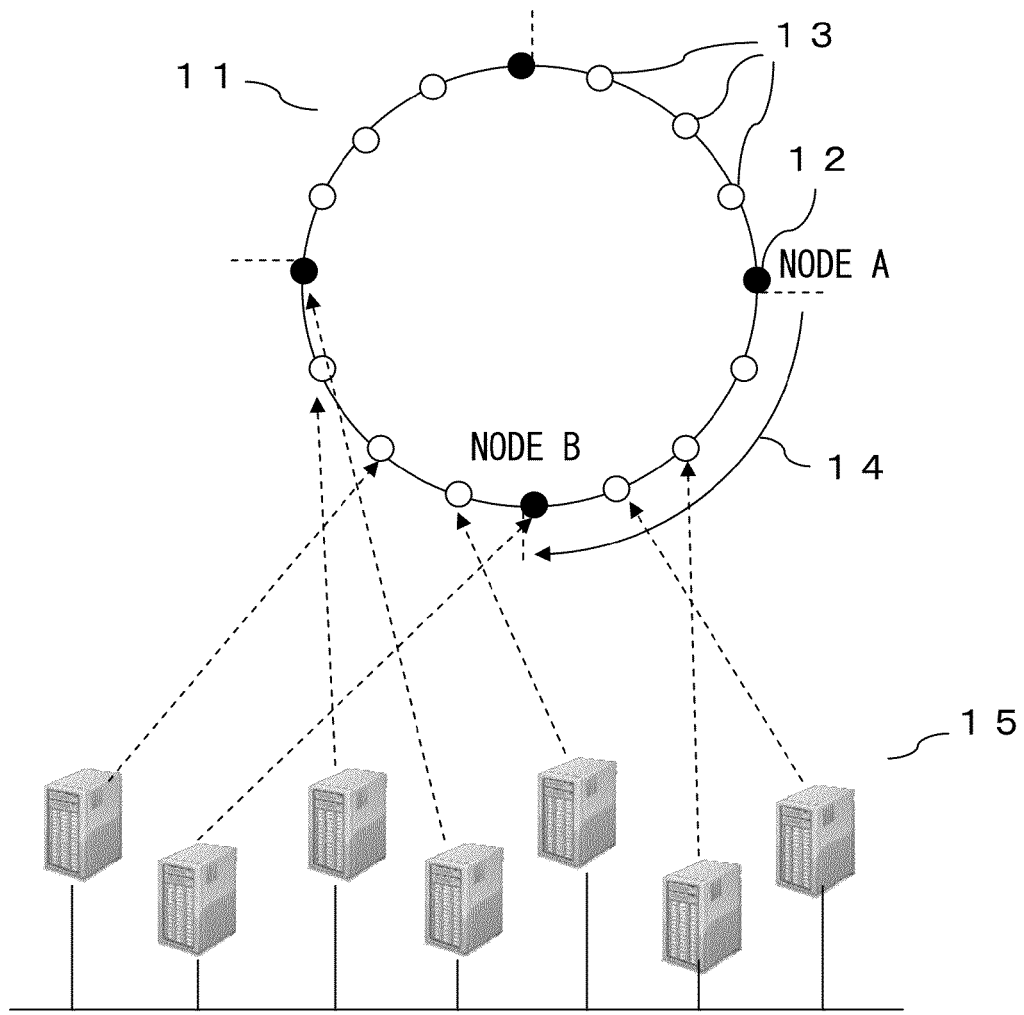
FIG. 2 is a diagram for illustrating a split hash in this embodiment.

FIG. 2 is a diagram for illustrating the split hash in this embodiment. Symbol 15 denotes a physical network 15. Symbol 11 denotes a hash space represented by a circle. More specifically, the entire circle represents a consistent hashing space. Small circles on the circle represent the respective servers.

First, a logical hash space 11 is formed on the physical network 15. As depicted as small circles in the hash space 11, the servers are mapped into the hash space. Furthermore, the hash space 11 is divided into multiple areas 14 according to the number of servers mapped into the hash space.

FIG. 2 depicts a state where one parent server 12 indicated by a black circle is selected in each of the areas 14. Servers indicated by white circles in each area 14 are referred to as child servers 13. The parent server 12 is a server as an "end" (e.g. the maximum value in the section in the case where the hash space is represented as numerical values) of the divided area 14, and supports the hash space after the hash space supported by the "previous" parent server to the hash space having the own hash value. This method is analogous to the method of determining the hash space supporting range by the server in CH.

The number of servers permitted in each area 14 is predetermined. When a server is to be added to the hash space indicated by the area 14 exceeding the permissible number of servers, the area 14 is divided as will be described later. In doing so, when the number of servers in the area 14 exceeds the threshold, the congested area is algorithmically divided. As a result, the network configuration is dynamically changed, thereby allowing the adverse effects of change to be localized.

FIG. 3 is a diagram for illustrating the relationship between the parent server and the child server on CH, and the network connection therebetween in this embodiment. An annulus ring denoted by symbol 21 indicates the entire CH. An annulus ring denoted by symbol 22 indicates the hash space (parent CH) formed by the parent servers 12. The parent CH 22 is a subset of the entire CH 21. The positions mapped into the hash space are identical to those of the entire CH 21.

Between the parent servers 12, an individual network is configured by the parent CH 21. In each area 14, an individual network is constructed between the servers included in the area 14. The hash space in each area 14 is referred to as a child CH 23.

The parent servers 12 perform alive monitoring and configuration monitoring on each other. Thus, as indicated by symbol 24, the parent servers 12 mutually form a fully meshed network. As indicated by symbol 25, a fully meshed network is also formed in the child CH 23 of each area 14. The servers in the area 14 perform alive monitoring and configurational information monitoring on each other. The fully meshed network is an example. Instead, a method with a low cost for alive monitoring and configurational information may be adopted.

Figure 4:
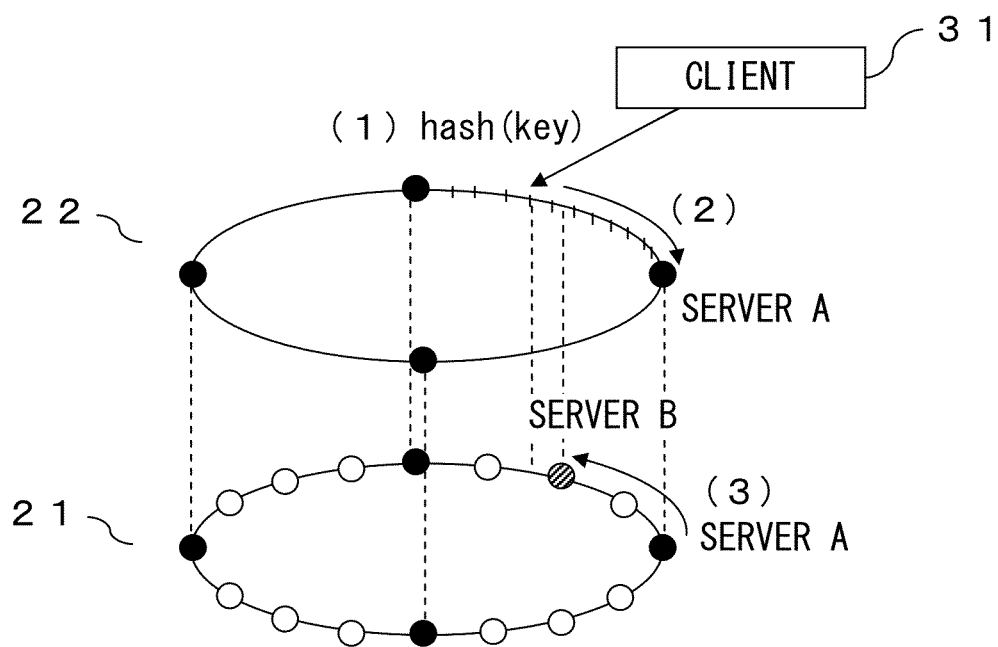
FIG. 4 is a diagram for illustrating routing in an overlay network in this embodiment.

FIG. 4 is a diagram for illustrating routing in the overlay network in this embodiment. The client 31 stores information concerning the parent CH 22 (parent CH information). When a request for an operation on data is issued by an application program, the client determines a server that is to be accessed, on the basis of the parent CH information. In FIG. 4, the hash value of a key indicates the server B in terms of the entire CH. However, the client 31 only views the parent server 12. First, the client 31 accesses the server A as the parent server, and notifies the request. The server A stores information on the child CH (child CH information) and information on the network path (network path information). Accordingly, the server A transfers the request issued by the client 31 to the server B using the child CH information and the network path information.

According to this embodiment, the overlay network reduces the load for maintaining the network to "1/the number of divided areas" owing to dynamic configurational change in comparison with the fully meshed network. Thus, the load on the network is distributed.

The overlay network of this embodiment reaches a target server at the number of transfers of "0 (the number of layers of divided areas)" owing to layering of the distributed hash. Accordingly, high speed response is achieved.

Examples of this embodiment will hereinafter be described.

Figure 5:
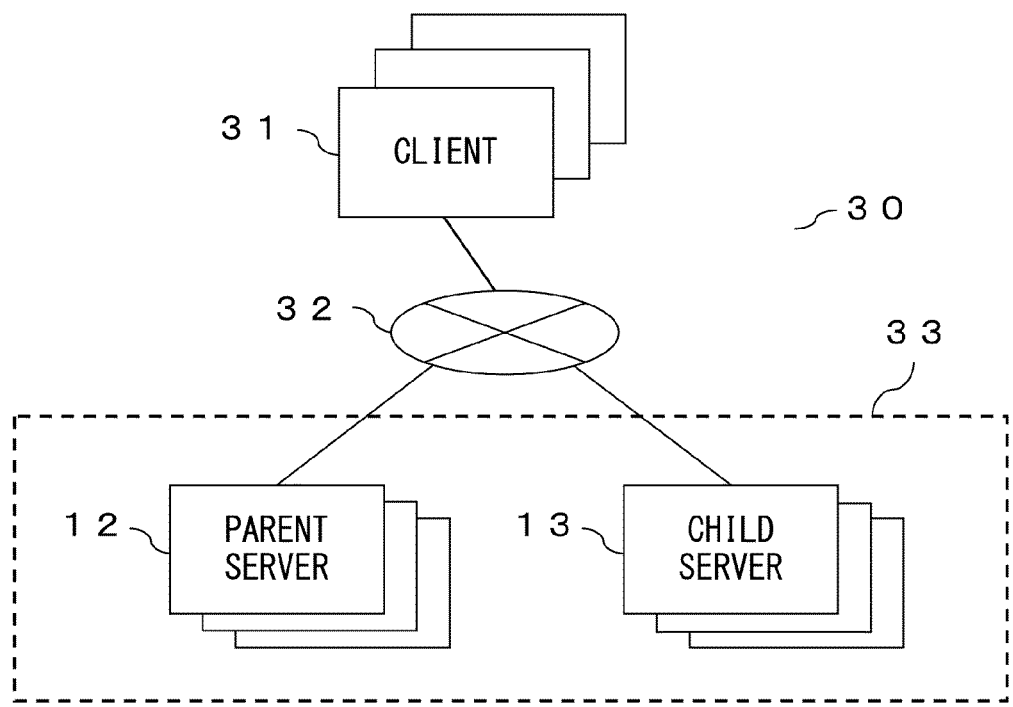
FIG. 5 illustrates an example of a network configuration of a distributed system in this embodiment.

FIG. 5 is an example of a network configuration of a distributed system in this embodiment. A distributed system 30 includes one or more clients 31, a communication network 32, and a plurality of servers 33. Each of the clients 31 and the servers 33 are connected via the communication network 32.

The client 31 represents an information processing terminal that is connected to the overlay network pertaining to the parent CH. The servers 33 are a group of servers configuring a CH space, and include at least one parent server 12 and at least one child server 13. The parent server 12 is a server that is capable of being referred to as a gateway of the overlay network. The child server 13 is at an end of the network 32.

Figure 6:
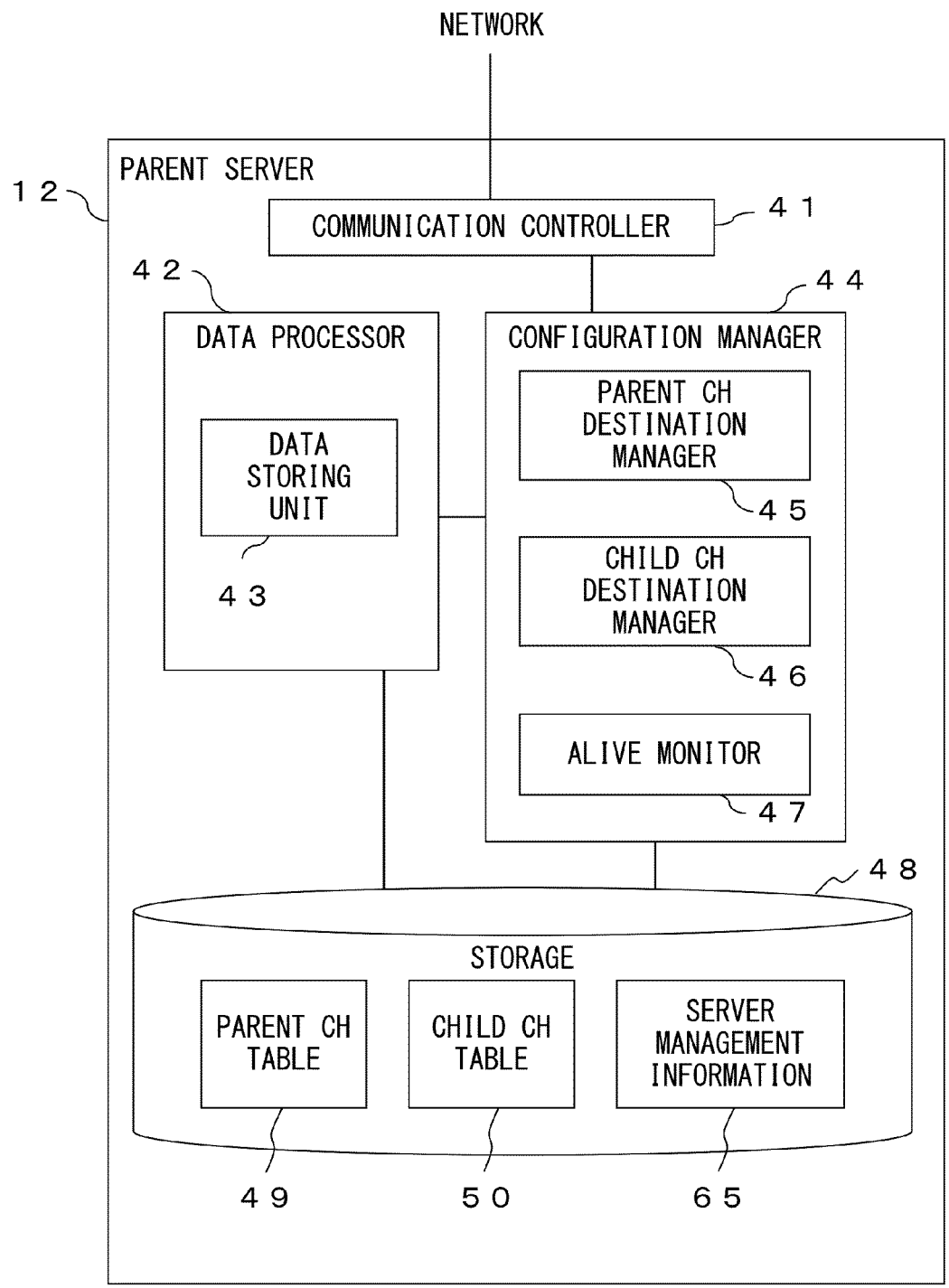
FIG. 6 is an example of the configuration of the parent server in this embodiment.

FIG. 6 is an example of the configuration of the parent server in this embodiment. The parent server 12 includes the communication controller 41, a data processor 42, the configuration manager 44, and the storage 48. The storage 48 stores a parent CH table 49, a child CH table 50, server management information 65 and the like. The communication controller 41 controls communication between the servers and communication with the clients 31 that are connected via the network 32. The data processor 42 includes a data storing unit 43 that stores data supported by the parent server 12, and processes the stored data.

The configuration manager 44 manages the configuration of the parent CH on the same layer as that of the parent servers 12, and the configuration of the child CH of the child server 13 included in the area to which the parent server belongs. The configuration manager 44 includes a parent CH destination manager 45, the child CH destination manager 46, and an alive monitor 47. The parent CH destination manager 45 manages information pertaining to the parent CH on the same layer as that of the parent server 12 using the parent CH table stored in the storage 48. The child CH destination manager 46 manages information pertaining to the child CH in the area 14 supported by the parent server 12 using the child CH table stored in the storage 48. The alive monitor 47 performs alive monitoring on the other parent servers 12 and the child servers 13 in the supported area 14. That is, the alive monitor 47 monitors addition of a server to the network and withdrawal of a server from the network.

FIG. 7 illustrates an example of the configuration of the child server in this embodiment. The child server 13 is the same as the parent server 12 except for the parent CH destination manager 45 and the parent CH table 49 being removed. The child server 13 includes the communication controller 41, the data processor 42, the configuration manager 44, and the storage 48. The storage 48 stores the child CH table 50, the server management information 65 and the like. The communication controller 41 controls communication with the parent server 12 and communication with the child server 13 in the area 14 to which the child server 13 belongs; the communication is established via the network 32. The data processor 42 includes the data storing unit 43 that stores data supported by the child server 13, and processes the stored data.

The configuration manager 44 manages the configuration of the child CH pertaining to the area 14 to which the child server 13 belongs. The configuration manager 44 includes the child CH destination manager 46, and the alive monitor 47. The alive monitor 47 performs alive monitoring on the parent server 12 in the area to which this child server 13 belongs and the child servers 13 in the area to which this child server 13 belongs. That is, the alive monitor 47 monitors addition of a server to the network and withdrawal of a server from the network.

FIG. 8 illustrates an example of the configuration of the client in this embodiment. The client 31 includes an application program 51, a library 52, a destination controller 53, the communication controller 55, and the storage 56. The application program (hereinafter, referred to an "application") 51 requests the server to operate data, on the basis of an instruction by a user. The library 52 provides an application program interface (API) for accessing from the application to the distributed system 30 in this embodiment. The storage 56 stores the parent CH table 49, user data and the like.

The destination controller 53 manages the destination information for each server. The destination controller 53 includes the parent CH destination manager 54. The parent CH destination manager 54 identifies the parent server 12 as the destination using the parent CH table 49 stored in the storage 56. The communication controller 55 controls communication with the server connected via the network 32.

Figure 9:
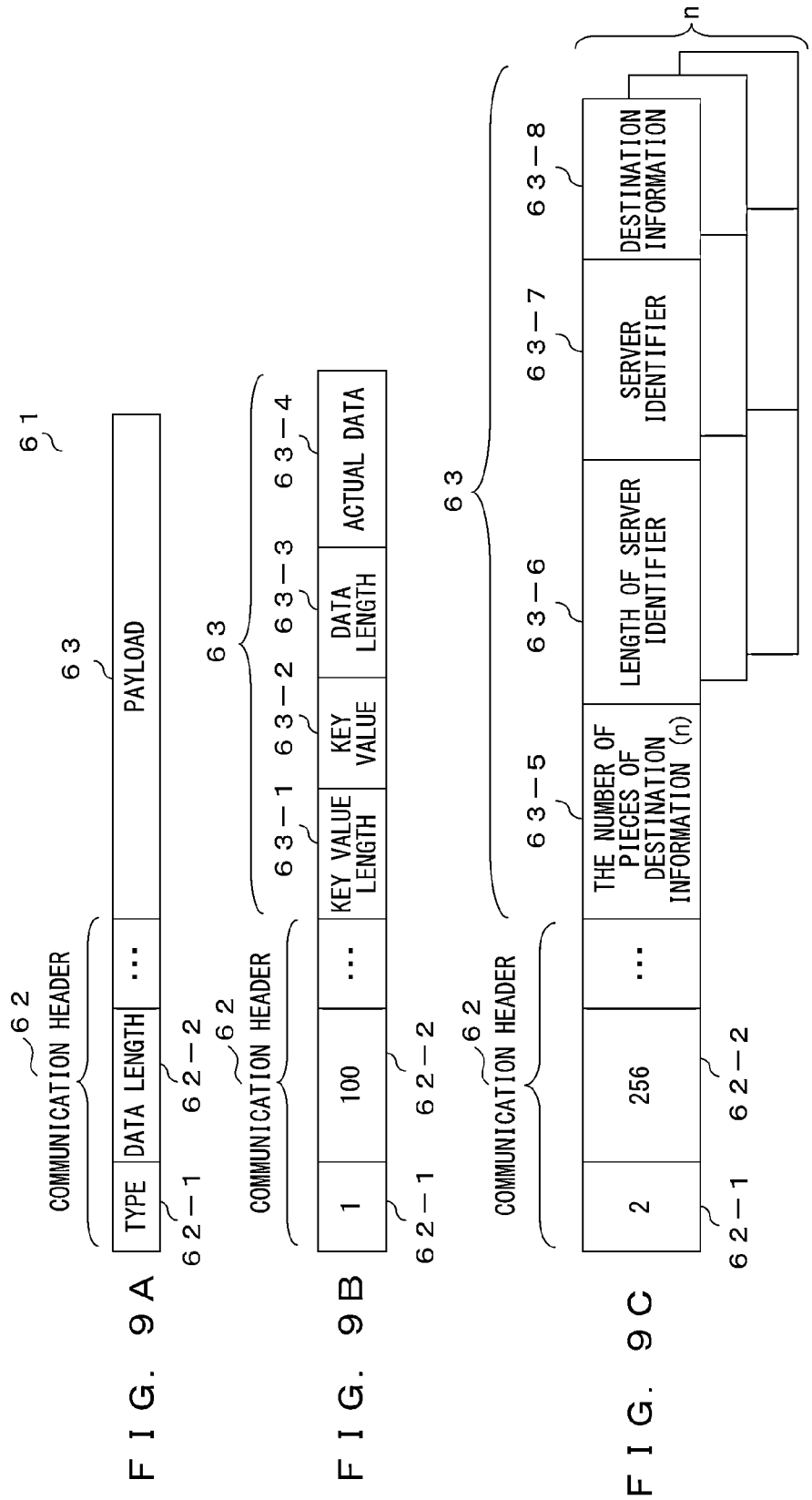
FIGS. 9A, 9B and 9C illustrate examples of the structures of communication information used for communication between clients and servers or between servers in this embodiment.

FIGS. 9A, 9B and 9C illustrates examples of the structures of communication information used between clients and servers or between servers in this embodiment. Communication information 61 illustrated in FIG. 9A includes a communication header 62, and a payload 63. The communication header 62 includes a "communication type" 62-1, a "data length" 62-2, and information used in a communication protocol. The "data length" 62-2 represents the data length (data size) of the payload 63.

The "communication type" 62-1 is for identifying the type of communication. The configuration of the payload 63 is changed according to the communication type. For instance, in the case where the content of the request indicates data update to the server, a "data update request" is set in the "communication type" 62-1. In this case, as illustrated in FIG. 9B, the payload 63 has a variable-length structure including a "key value length" 63-1 of data for CH, a "key value" 63-2, a "data length" 63-3, and "actual data" 63-4.

In the case where the content of the request represents transmission of data for operating a CH table 50, "CH table transmission" is set in the "communication type" 62-1. In this case, as illustrated in FIG. 9C, the payload 63 includes "the entire number of pieces of destination information" 63-5, the "length of a server identifier" 63-6, the "server identifier" 63-7, and "destination information" 63-8. The entire number of pieces of destination information is set in the "the entire number of pieces of destination information" 63-5. The size of the server identifier is set in the "length of a server identifier" 63-6. Information for identifying the server is set in the "server identifier" 63-7. Information on the destination is set in the "destination information" 63-8. The "length of a server identifier" 63-6, the "server identifier" 63-7, and the "destination information" 63-8 configure a battery. The batteries as many as the entire number of pieces of destination information (n batteries) are included.

Figure 10:
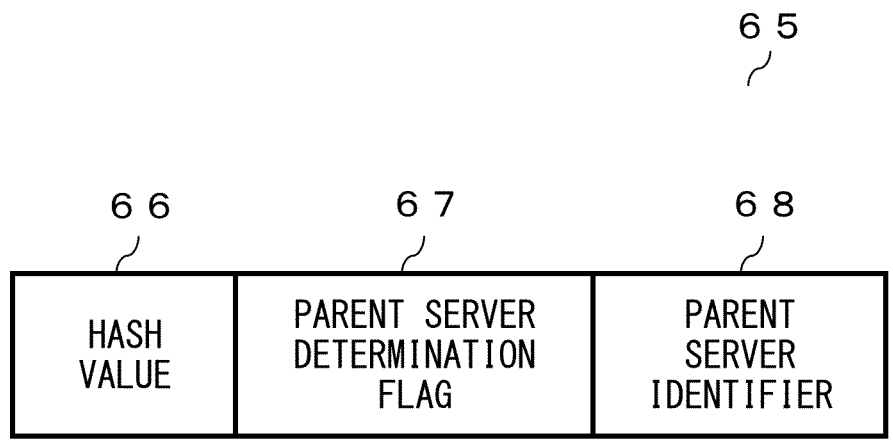
FIG. 10 illustrates an example of server management information in this embodiment.

FIG. 10 illustrates an example of server management information in this embodiment. The server management information 65 is information that is held by each server and pertains to the server itself, and stored in the storage 48 in the server. The server management information 65 includes a "hash value" 66, a "parent server determination flag" 67, and a "parent server identifier" 68. The hash value assigned to the corresponding server is stored in the "hash value" 66. Information representing whether the server is a parent server or not is stored in the "parent server determination flag" 67. In the case where the server is not a parent server (is a child server), identification information for identifying the parent server in the area to which the server concerned belongs is stored in the "parent server identifier" 68.

FIG. 11A illustrates an example of a server information structure for constructing the parent CH or the child CH in this embodiment. FIG. 11B illustrates an example of a server information structure in this embodiment. Server information pertaining to the parent CH constructed by the server information structure is stored in the storage 56 of the client 31 and the storage 48 of the parent server 12. Server information pertaining to the child CH constructed by the server information structure is stored in the storage 48 of the child server 13.

A server information structure 71 is a data structure that includes a "server identifier" 72, a "hash value" 73, a "destination information" 74, "address information 1" 75, and "address information 2" 76.

The "server identifier" 72 is identification information of the server that is unique over the entire system, and serves as a key in the case of configuring the CH. The server identifier may be any type of information, such as character strings and numerical values, which is available in hash calculation.

The "hash value" 73 is a value generated through the hash function on the basis of the "server identifier" 72, and a numerical value starting from zero; the maximum value is determined according to the system scale. The "destination information" 74 is information for communication between the servers, and information, such as an IP address or a host name, that allows the communication protocol to be resolved.

The "address information 1" 75 and the "address information 2" 76 are address information of an operating system (OS), serves as a pointer to another piece of server information, and are used in the data structure for searching the hash space, which will be described later.

Figure 12:
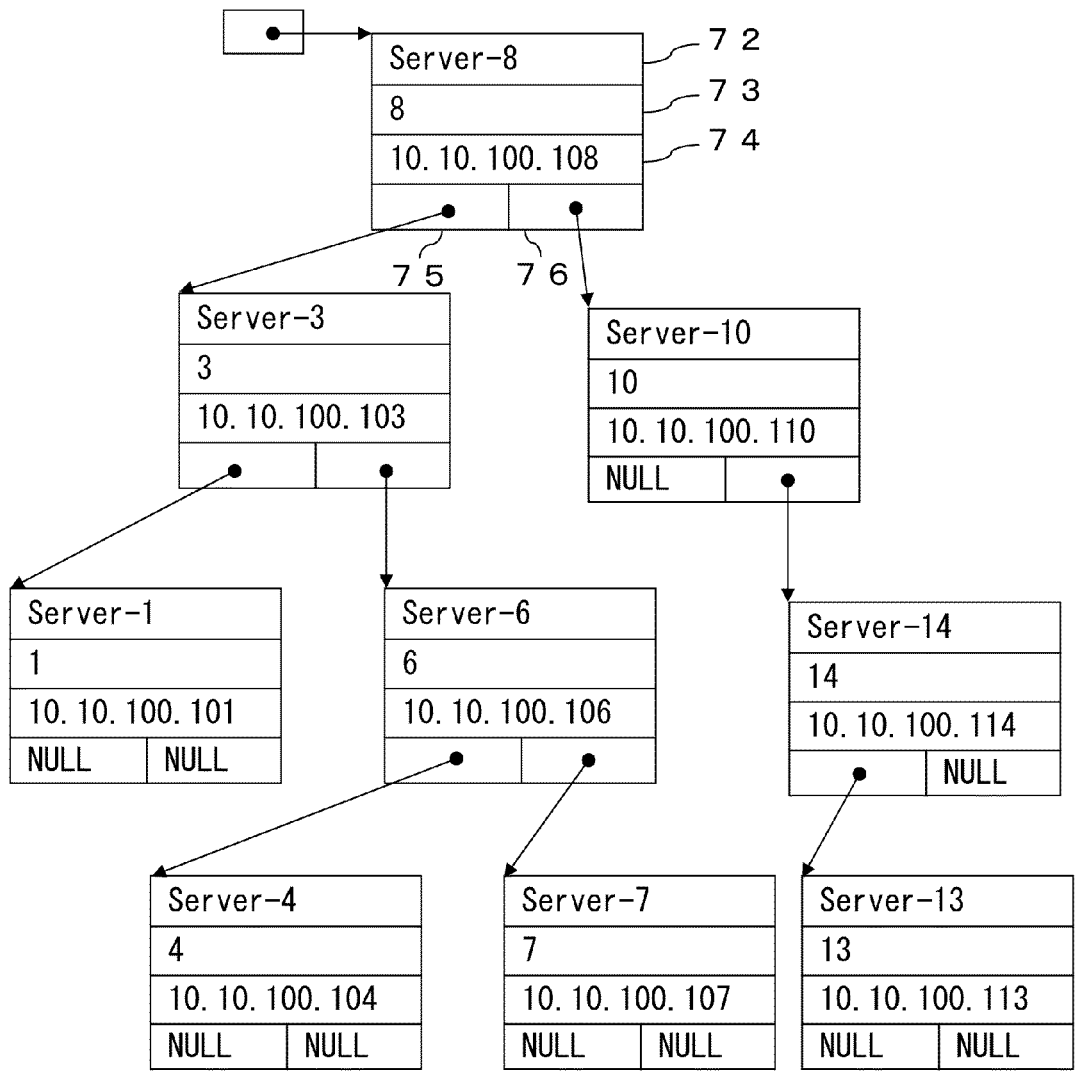
FIG. 12 illustrates an example of a data structure of a CH table in this embodiment.

FIG. 12 illustrates an example of a data structure of the CH table in this embodiment. The data structure of the CH table is a structure common in the parent CH table 49 and the child CH table 50. The data structure of the CH table is used for searching for a server in the parent CH destination manager 45, the child CH destination manager 46, and the parent CH destination manager 54. For instance, it is represented as a binary search tree in FIG. 12. The tree may be a self-balancing binary search tree or another data structure for search. Here, as an example of implementation, a search method in the case of using a binary search tree will be described.

Each of nodes and leaves in the binary search tree has the server information structure 61 illustrated in FIG. 9A. Here, the "hash value" 63 is represented to have an integer value for the sake of understanding. However, in actuality, the value is represented as a type depending on the hash function. The "address information 1" 75 and the "address information 2" 76 indicate the leading address of the server information structure that is a child in the binary search tree. The "address information 1" 75 serves as a link to the server information structure having the hash value lower than the node concerned. The "address information 2" 76 serves as a link to the server information structure having the hash value higher than the node concerned. Without information on any server to be a child, "NULL" is stored in the "address information 1" 75 or the "address information 2" 76.

Figure 13:
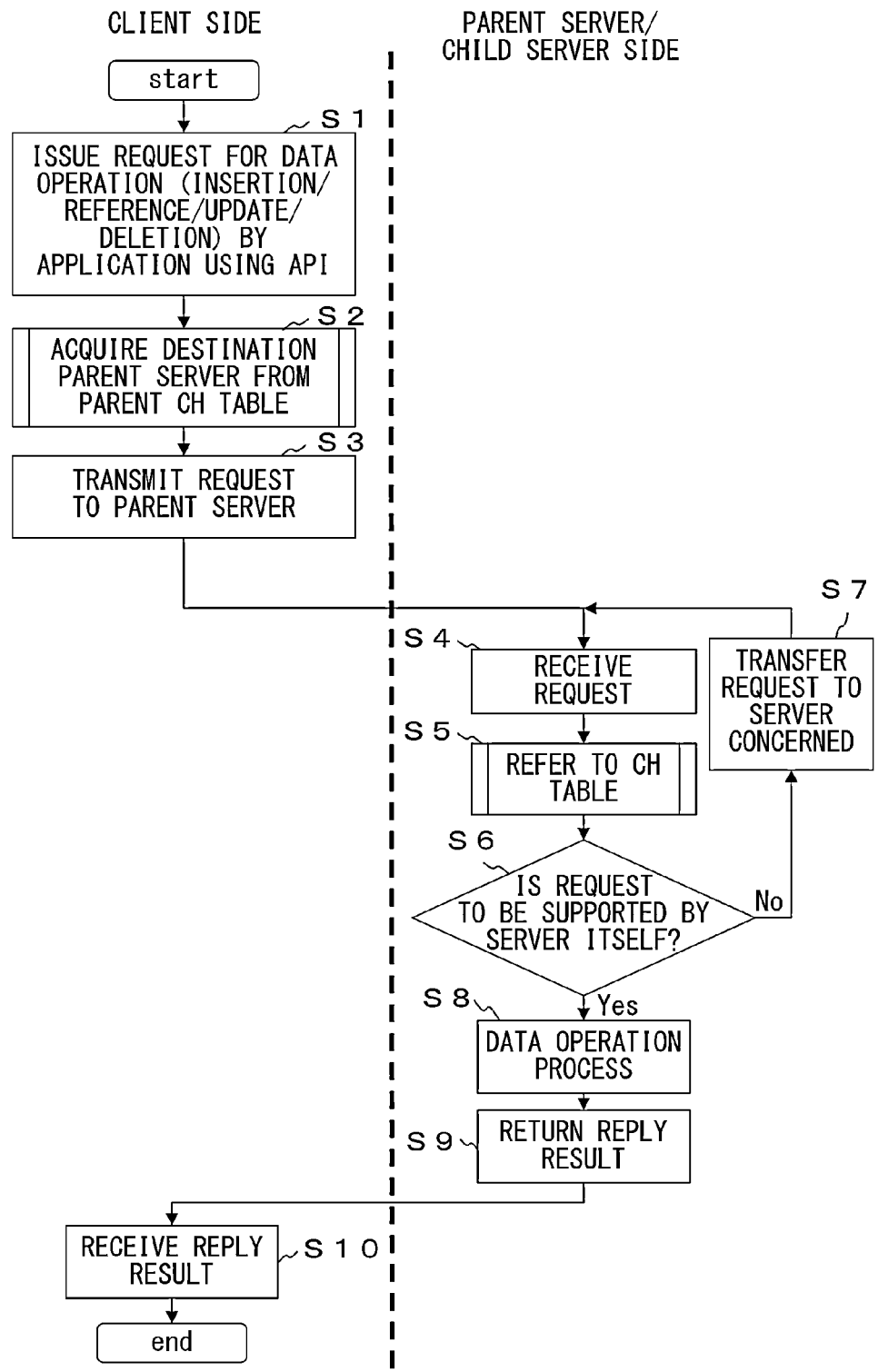
FIG. 13 illustrates a flow of data access to the distributed system in this embodiment.

FIG. 13 illustrates a flow of data access to the distributed system in this embodiment. Referring to FIG. 13, an example of a process of accessing data from the client 31 will be described.

In the client 31, a request for data operation (insertion, reference, update, deletion, etc.) is issued by the application 51 to the destination controller 53 using the API included in the library 52 (S1). Here, the library 52 acquires the hash value using the hash function on the basis of the server identifier passed from the application 51, and passes the hash value to the parent CH destination manager 54.

The parent CH destination manager 54 refers to the parent CH table 49 stored in the storage 56, and searches the parent CH table 49 for the parent server 12 on the basis of the key value provided from the library 52. The parent CH destination manager 54 acquires, from the parent CH table 49, the destination information (IP (internet protocol) address, host name, etc.) for the parent server 12 (S2).

The library 52 determines the communication type on the basis of the received request for data operation, and generates the communication information 61 illustrated in FIG. 9A on the basis of the determined communication type. The library 52 transmits the generated communication information 61 to the parent server 12 indicated by the acquired destination information via the communication controller 55 (S3).

In the parent server 12, the communication controller 41 receives the communication information 61 from the client 31 (S4). The parent CH destination manager 45 then searches the child CH table 50 stored in the storage 48 for the child server 13 on the basis of the "key value" 63-2 in the communication information (S5).

As a result of the search, when it is determined that the request is be supported by the server having received the request ("Yes" in S6), the data storing unit 43 performs the data operation process (S8) and returns a reply result after the process to the client 31 (S9). The client 31 receives the reply result (S10).

As a result of the search, when it is determined that the request is not to be supported by the server having received the request ("No" in S6), the configuration manager 44 performs the following process. That is, the configuration manager 44 transfers the received request message to the child server (the child server in the same area) 13 that is the destination retrieved from the child CH table 50 (S7). When the request message is not data in the area to which the parent server 12 belongs, the configuration manager 44 searches the parent CH table 49 and transfers the request message to the retrieved parent server 12. The parent server 12 receiving the transferred request message performs processes in and after S4.

Figure 14:
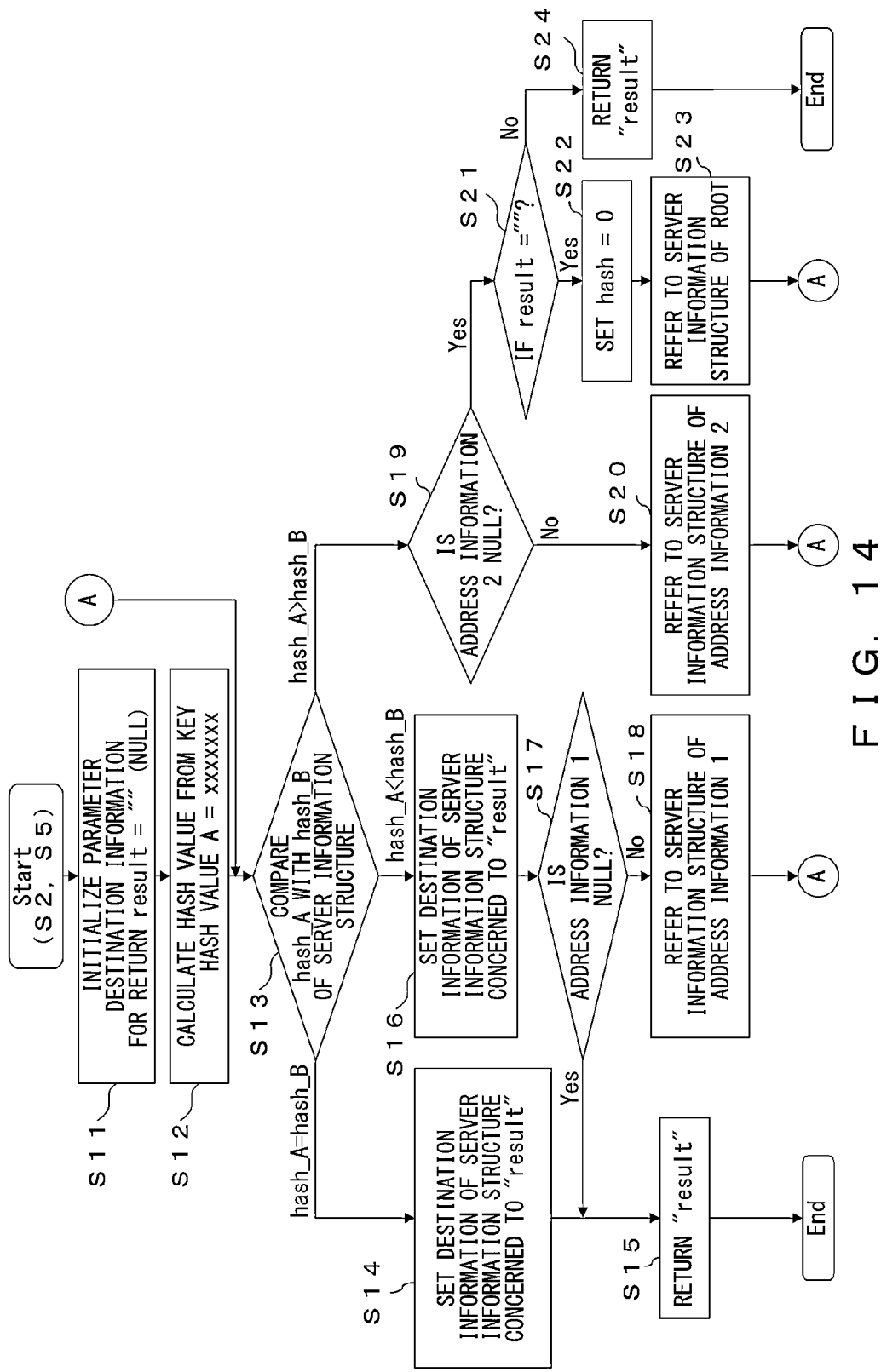
FIG. 14 illustrates a flow of searching for the CH table in this embodiment.

FIG. 14 illustrates a flow of searching for the CH table in this embodiment. This flow is a detailed flow of S2 and S5 of FIG. 13, and applied in the case of searching for the target server using the parent CH table 49 or the child CH table 50. Here, the flow will be described that passes the key of certain data to the parent CH destination manager 45, the child CH destination manager 46, or the parent CH destination manager 54, and identifies the server in which the data resides, on the basis of the CH table in FIG. 12. Hereinafter, the parent CH destination manager 45, the child CH destination manager 46, or the parent CH destination manager 54 is referred to as a destination manager.

First, the destination manager initializes a parameter "result" used in this flow with " " (NULL) (S11). The "result" is a parameter representing destination information that is to be returned as a result of the search.

Next, the destination manager converts the key into a hash value using a prescribed hash function, and stores the value in the parameter "hash_A" (S12). SHA-1, MD5 or the like may be used as the hash function. The destination manager compares the hash value stored in the parameter "hash_A" with the hash value (hash_B) of the server information structure of the "Server-8" at the root in the CH table (S13). Hereinafter, the way of transition of the flow according to the value of the hash_A will be described with reference to an example.

(i) The case where hash_A=5

In FIG. 12, the hash value hash_B of the server information structure of the root node being currently referred to is 8, "hash_A<hash_B (=8)" (S13). In this case, the destination manager temporarily sets the return value "result" to the destination information "10.10.100.108" of the server information structure being currently referred to (S16). Since the destination manager compares the hash_A with the smaller hash_B, the destination manager refers to the server information structure indicated by the address information 1 of the server information structure being currently referred to ("No" in S17, S18).

Thus, the server information structure of "Server-3" to be referred to is the server information structure being currently referred to. Accordingly, the destination manager performs setting of hash_B=3. Here, since "hash_A>hash_B (=3)" (S13), the destination manager refers to the server information structure indicated by the address information 2 of the server information structure that is currently being referred to ("No" in S19, S20).

The server information structure of "Server-6" to be referred to is the server information structure being currently referred to. Accordingly, the destination manager performs setting of hash_B=6. Here, since "hash_A<hash_B (=6)" (S13), the destination manager sets, in the "result", the destination information "10.10.100.106" of the server information structure being currently referred to (S16). The destination manager then refers to the server information structure indicated by the address information 1 of the server information structure being currently referred to ("No" in S17, S18).

The server information structure of "Server-4" to be referred to is the server information structure being currently referred to. Accordingly, the destination manager performs setting of hash_B=4. Here, "hash_A>hash_B (=4)" (S13), and there is no child (server information structure) that has a higher value than that of the server information structure being currently referred to (address information 2 is NULL) ("Yes" in S19). Accordingly, the destination manager performs the following process. That is, the destination manager returns the "result"="10.10.100.106" and finishes the process ("No" in S21, S24).

(ii) The case where the hash value is 3 (the case where the hash value matches)

In FIG. 12, the hash value hash_B of the server information structure of the root node being currently referred to is 8. Accordingly, "hash_A<hash_B (=8)" (S13). In this case, the destination manager temporarily sets, in the return value "result", destination information "10.10.100.108" of the server information structure being currently referred to (S16). Since the destination manager compares the hash_A with the lower hash_B, the destination manager refers to the server information structure indicated by the address information 1 of the server information structure being currently referred to ("No" in S17, S18).

The server information structure of "Server-3" to be referred to is the server information structure being currently referred to. Accordingly, the destination manager performs setting of hash_B=3. Here, since "hash_A=hash_B (=3)" (S13), the target server is determined. In this case, the destination manager sets, in the "result", destination information "10.10.100.103" of the server information structure being currently referred to (S14, S15).

(iii) The case where hash_A=15 (around the entire circular hash space)

In FIG. 12, the hash value of the server information structure of the root node being currently referred to is 8. Accordingly, "hash_A>hash_B (=8)" (S13). In this case, the destination manager refers to the server information structure indicated by the address information 2 of the server information structure being currently referred to ("No" in S19, S20).

Thus, the server information structure of "Server-10" to be referred to is the server information structure being currently referred to. Accordingly, the destination manager performs setting of hash_B=10. Here, since "hash_A>hash_B(=10)" (S13), the destination manager refers to the server information structure indicated by the address information 2 of the server information structure being currently referred to ("No" in S19, S20).

Thus, the server information structure of "Server-14" to be referred to is the server information structure being currently referred to. Accordingly, the destination manager performs setting of hash_B=14. Here, since "hash_A>hash_B (=14)" (S13) and the address information 2 of the server information structure being currently referred to is NULL ("Yes" in S19), result=" " (NULL) ("Yes" in S21). In this case, destination manager determines that the key has been around the entire circular hash space, sets "0" in the hash_A (S22), and performs search from the server information structure of the root again (S23).

Thus, the server information structure "Server-8" to be referred to is the server information structure being currently referred to. Accordingly, the destination manager performs setting of hash_B=8. Here, since "hash_A<hash_B (=8)" (S13), the destination manager sets, in the "result", destination information "10.10.100.108" of the server information structure being currently referred to (S16). The destination manager refers to the server information structure indicated by the address information 1 of the server information structure being currently referred to ("No" in S17, S18).

Thus, the server information structure of "Server-3" to be referred to is the server information structure being currently referred to. Accordingly, the destination manager performs setting of hash_B=3. Here, since "hash_A<hash_B (=3)" (S13), the destination manager sets, in the "result", destination information "10.10.100.103" of the server information structure being currently referred to (S16). The destination manager refers to the server information structure indicated by the address information 1 of the server information structure being currently referred to ("No" in S17, S18).

Thus, the server information structure of "Server-1" to be referred to is the server information structure being currently referred to. Accordingly, the destination manager performs setting of hash_B=1. Here, since "hash_A<hash_B (=1)" (S13), the destination manager sets, in the "result", destination information "10.10.100.101" of the server information structure being currently referred to (S16). The address information 1 of the server information structure being currently referred to is NULL ("Yes" in S17). Accordingly, the destination manager returns a result="10.10.100.101" (S15).

Only the flow of searching for the CH table is illustrated here. Since simple addition and deletion of the server (node) to and from the CH table are according to the binary search tree, the description thereof is omitted here.

Next, an example of dynamic change of the hash space will be described.

FIGS. 15A-15D are diagrams for illustrating dynamic division of a split hash in this embodiment. The split hash has a parameter common in the system, which is "the upper limit of the number of servers in an area". When the number of servers included in one area exceeds this value, the area is divided. In FIGS. 15A-15D, the upper limit of the number of servers in an area (threshold) is 10.

Figure 15A:
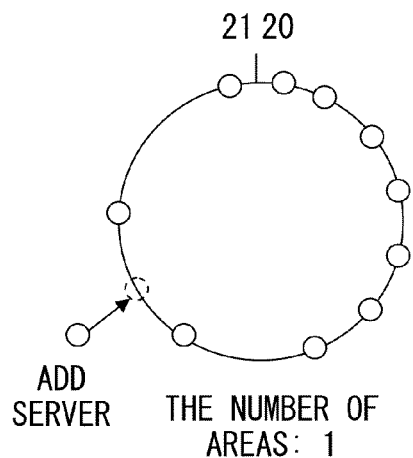
FIGS. 15A-15D are diagrams for illustrating dynamic division of a split hash in this embodiment.
Figure 15B:
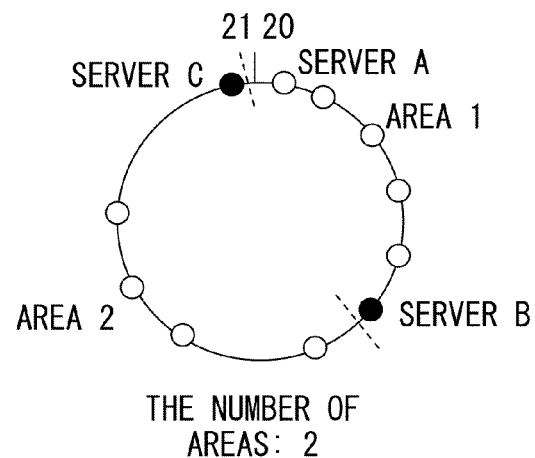

FIG. 15A depicts a state where ten servers, which are as many as the upper limit of the number of servers, are arranged in the area (division has not occurred even once in this case). When the number of servers becomes 11 by adding a new server, the area is divided at a boundary at a server on a position of half the number of servers or half plus one according to the hash value sequence (referred to as "intermediate server" in the area). FIG. 15B illustrates the result after division.

FIG. 15B depicts a state where boundaries for division are provided at the server A that is on the starting point of the hash space, and the server B as the sixth server disposed at half the number of servers in the area counted from the starting point, and the space is divided into areas 1 and 2. The servers B and C that are at the ends of the respective areas 1 and 2 are parent servers.

Figure 15C:
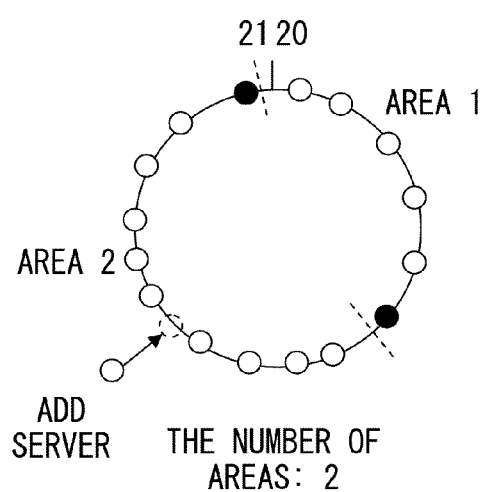
Figure 15D:
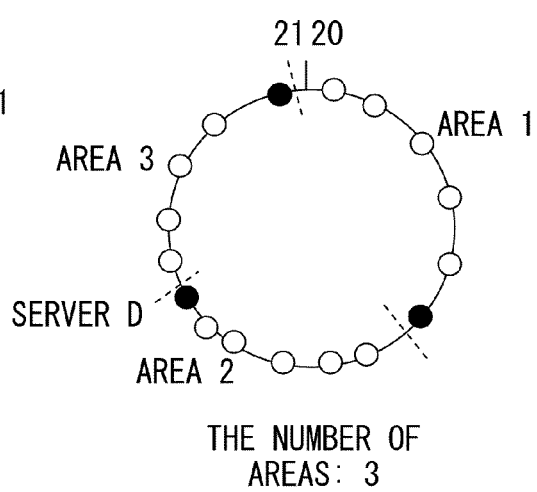

FIGS. 15C and 15D depict states where the number of servers in the area 2 increases to reach the upper limit of the number of servers in the area 2, and subsequently a server is further added. In this case, the area 2 is divided into two. However, the addition does not affect the range of the area 1.

FIG. 16 illustrates a processing flow executed by a server that is to be added to the split hash in this embodiment. The server alive monitor 47 monitors operation states of the other servers in the network, thereby monitoring participation of a server to the network (S31). The server is added in different manners between the case of constructing the CH table for the first time and the case of adding the server to the existing CH table.

In the case of constructing the CH for the first time (newly creating the network), the hash space has not been divided yet. Accordingly, the server sets the upper limit of the number of servers in an area, on the basis of information input by an administrator (S32). The server converts the server identifier of itself into a hash value, and sets the hash value in the server management information 65. The server creates the CH table 50 (S33), and registers the hash value of itself, the server identifier, destination information, and pieces of address information 1 and 2. The server increments the number of servers in the area (i.e., setting the number such that the number of servers=1 in the current area) (S34).

The server to be added thereafter to the CH (in the case of addition of the second server or thereafter to the network) communicates with any of the servers having already participated in the CH (having a gateway function) (S35) to issues a request for participating in the CH (S36). The process of S36 will be described in detail in with reference to FIG. 17. The server to be added receives response information from the server from which participation has been requested (S37). The response information is transmitted in, for instance, the format described with reference to FIGS. 9A-9C.

When the server to be added determines that the server itself is a child server on the basis of the response information ("No" in S38), the server performs the process of S42. At this time, the server to be added updates "parent server determination flag" 67 of the server management information with "child server" using the reply result, and updates the "parent server identifier" 68.

When the server to be added determines that the server itself is a parent server on the basis of the response information ("Yes" in S38), the server constructs the parent CH table 49 from the response information (S39), and establishes network communication between the parent servers 12 (S40). The server to be added stores, in the storage 48, the upper limit of the number of servers in an area, on the basis of the response information, and the current number of servers in the area (S41). The server to be added updates the "parent server determination flag" 67 of the server management information with "parent server" using the reply result, and updates the "parent server identifier" 68 with the server identifier of the server itself.

The server to be added constructs the child CH table 50 in the area to which the server itself belongs on the basis of the response information (S42), and establishes connection to the child server 13 on the basis of the CH table 50 (S43). In this case, each child server 13 is disconnected from the previous parent server 12.

Addition of the server changes the hash space supported by the data. Accordingly, a process of transferring data managed according to the changed hash space is performed between the server where the hash space is changed and the added server (S44). The data transfer process is a typical technology on CH. Accordingly, the description thereof is omitted.

Figure 17:
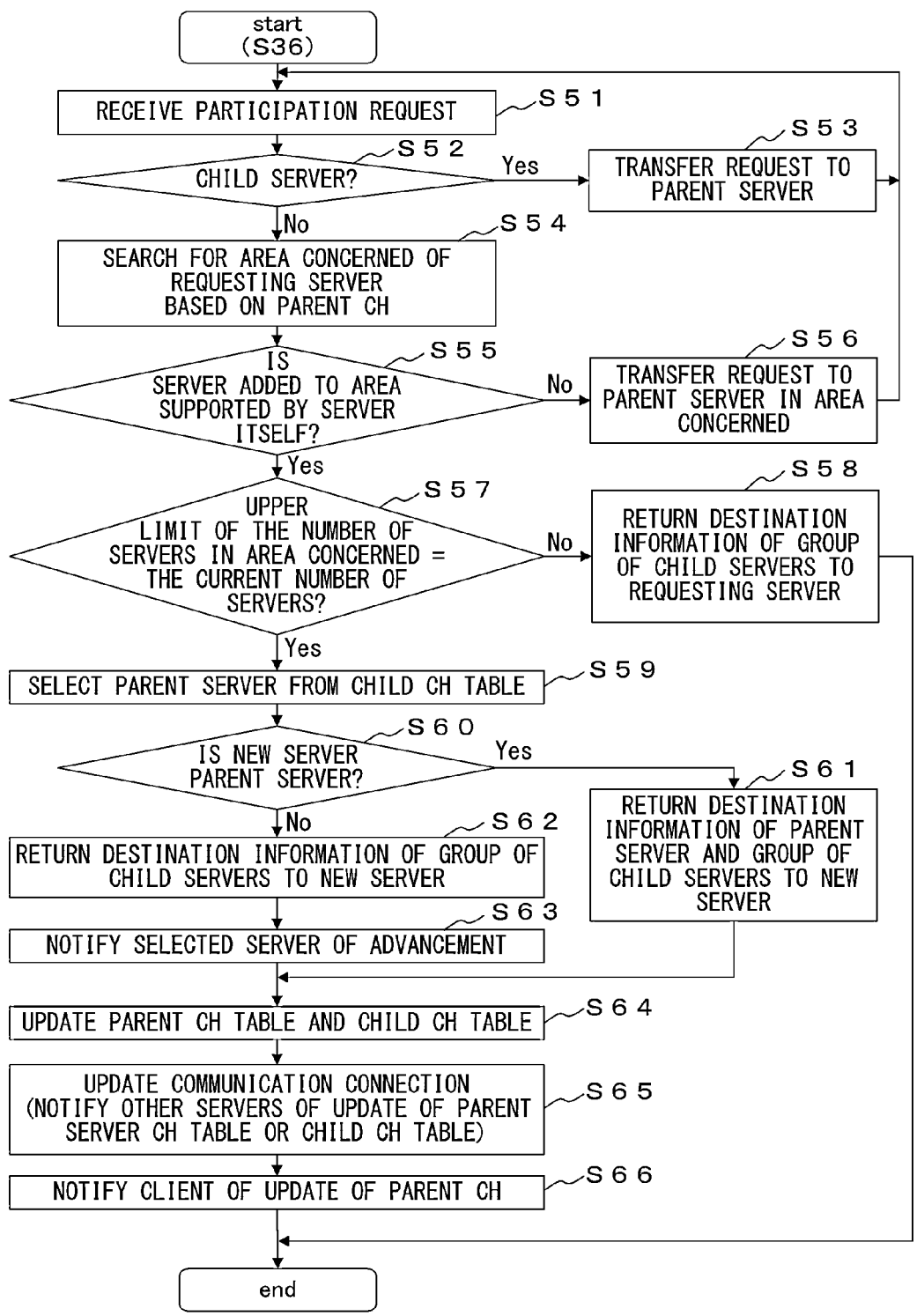
FIG. 17 illustrates a detailed flow of participation request process (S36) of FIG. 16.

FIG. 17 illustrates a detailed flow of participation request process (S36) of FIG. 16. FIG. 17 is a processing flowchart of the existing server having received a participation request issued by the server to be added (participation requesting server). In S36 of FIG. 16, any of the servers having already participated in the CH receives the request for participating in the split hash that has been issued by the participation requesting server (S51). When the prescribed server accepting the request for participating in the split hash is the child server 13 (S52), the child server 13 transfers the request for participating in the split hash to the parent server 12 in the area to which the server itself belongs (S53).

When the server having accepted the participation request in the split hash is a parent server (referred to as a target parent server) 12 ("No" in S52), the target parent server performs the following process. That is, the target parent server calculates the hash value on the basis of the server identifier of the participation requesting server using the hash function, performs the processes of FIG. 14 using the parent CH table, and searches for the parent server that supports the hash value (S54). As a result of the search, when the hash value corresponds to the area supported by another server (No in S55), the target parent server transfers the request to the retrieved parent server (S56).

As a result of the search, when the hash value corresponds to the area supported by the server itself ("Yes" in S55), the target parent server identifies the current number of servers in the area, and determines whether the number of servers in the area exceeds the upper limit or not when the server is added (S57).

When the number of servers in the area does not exceed the upper limit when the server is added ("No" in S57), the target parent server returns, as a response, a group of pieces of server destination information needed to construct a child CH, using the format of FIG. 9C, to the participation requesting server (S58).

When the number of servers in the area exceeds the upper limit when the server is added ("Yes" in S57), the target parent server selects the intermediate server in the area as the parent server from the child CH table including the participation requesting server as described with reference to FIGS. 15A-15D (S59).

When the selected parent server is an existing server ("No" in S60), the target parent server returns the child CH table in the divided area to the participation requesting server (S62). That is, the target parent server returns, to the participation requesting server, the destination information of the child server included in the hash space (area) from the starting point of the area to the point with the hash value of the selected server using the format of FIG. 9C. The target parent server notifies the selected existing server of advancement to the parent server (S63).

When the selected parent server is the participation requesting server ("Yes" in S60), the target parent server notifies the participation requesting server of advancement to the parent server. The target parent server returns, to the participation requesting server, the destination information of the child server included in the hash space from the starting point of the area to the point with the hash value of the participation requesting server using the format of FIG. 9C (S61).

Subsequently, the target parent server updates the parent CH table 49 and the child CH table 50 that the server itself has (S64). That is, the target parent server adds the selected parent server to the parent CH table 49 that the server itself has, thereby updating the parent CH table 49. The target parent server creates the child CH table 50 pertaining to the child servers where the child server notified in S61 and S62 to the participation requesting server is excluded from the child CH table 50 that the server itself has.

The target parent server updates network communication connection (path information) between the parent servers and in the area to which the parent server belongs, using the updated parent CH table and child CH table. Accordingly, communication between the parent server and the participation requesting server is established. Furthermore, the target parent server transmits the updated parent CH table 49 to the other parent servers. The target parent server transmits the updated child CH table 50 to the child servers in the area (S65). At this time, when the child server is advanced to the parent server, connection with the child server outside of the area is disengaged.

Subsequently, the target parent server notifies the client 31 of the updated parent CH table 59 (S66), and this flow is finished.

Although the illustration is omitted in FIG. 17, the upper limit of the number of servers in an area is used to construct a single area. When the upper limit of the number of servers is also assigned to the layer level of the parent CH in an analogous manner, the dividing method makes it possible to be configured in a nesting (layer) structure.

Figure 18A:
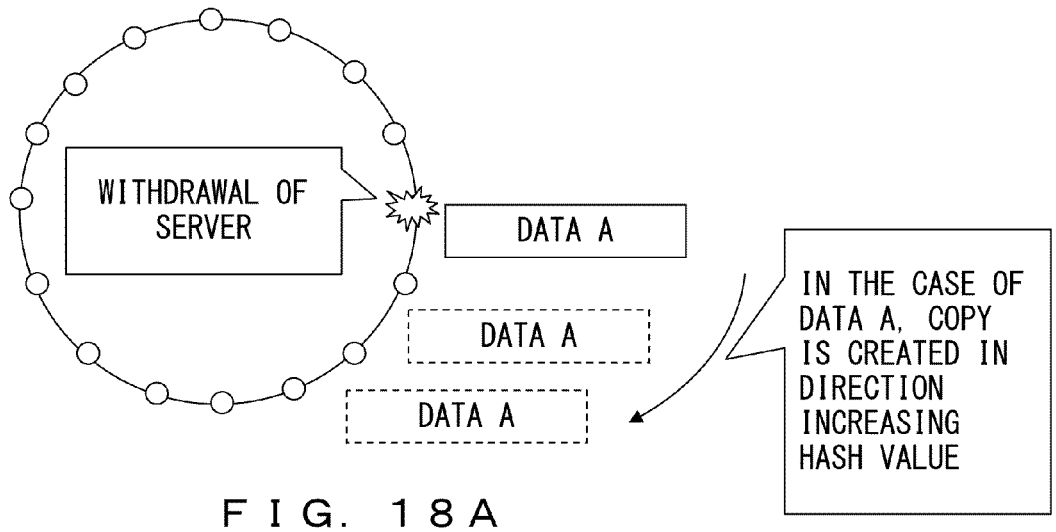
FIGS. 18A and 18B are diagrams for illustrating replication of the CH table in the split hash in this embodiment.
Figure 18B:
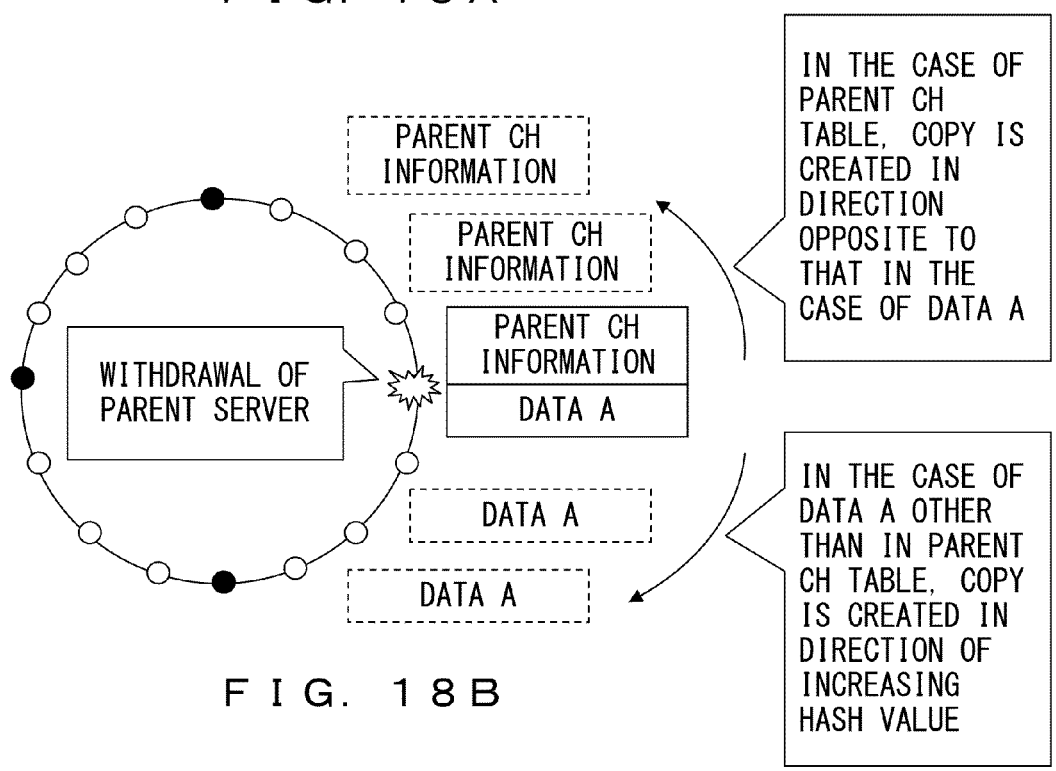

FIGS. 18A and 18B are diagrams for illustrating replication of the CH table in the split hash in this embodiment. In distributed data storing according to CH, data is copied in order to improve the availability of the distributed system. As illustrated in FIG. 18A, when the child server 13 is withdrawn from the hash space, the data of the withdrawn child server 13 is copied into a server in a direction of increasing the hash value in the hash space. Thus, in CH, the range from the previous server position to the next server position in the hash space is the supported space. Accordingly, when the previous server is withdrawn, the data of the withdrawn server is recovered quickly.

In the split hash, information pertaining to the parent CH table 49 is copied in the adjacent server, and the adjacent server is advanced as a new parent server when the parent server is withdrawn. As illustrated in FIG. 18B, as to typical data, the data of the server to be withdrawn is copied in a server in a direction of increasing the hash value in the hash space in a manner analogous to that of typical CH. However, the parent CH table 49 is copied in the server residing in the direction opposite to that in the case of the typical data. The operation is performed in order to maintain the characteristics that the parent server 12 is at the end of the area. When the copy was created in the direction identical to that of the typical data, withdrawal of the parent server would advance the "right-hand adjacent server" to a parent. Accordingly, the new parent server 12 would become a server belonging to the adjacent area. Thus, change in area configuration and reestablishment of network connection would become complicated. In contrast, as illustrated in FIG. 18B, creation of a candidate for the next parent server in the direction of reducing the hash space makes it possible to narrow down variation of network information in the area to that on the withdrawn server.

Figure 19:
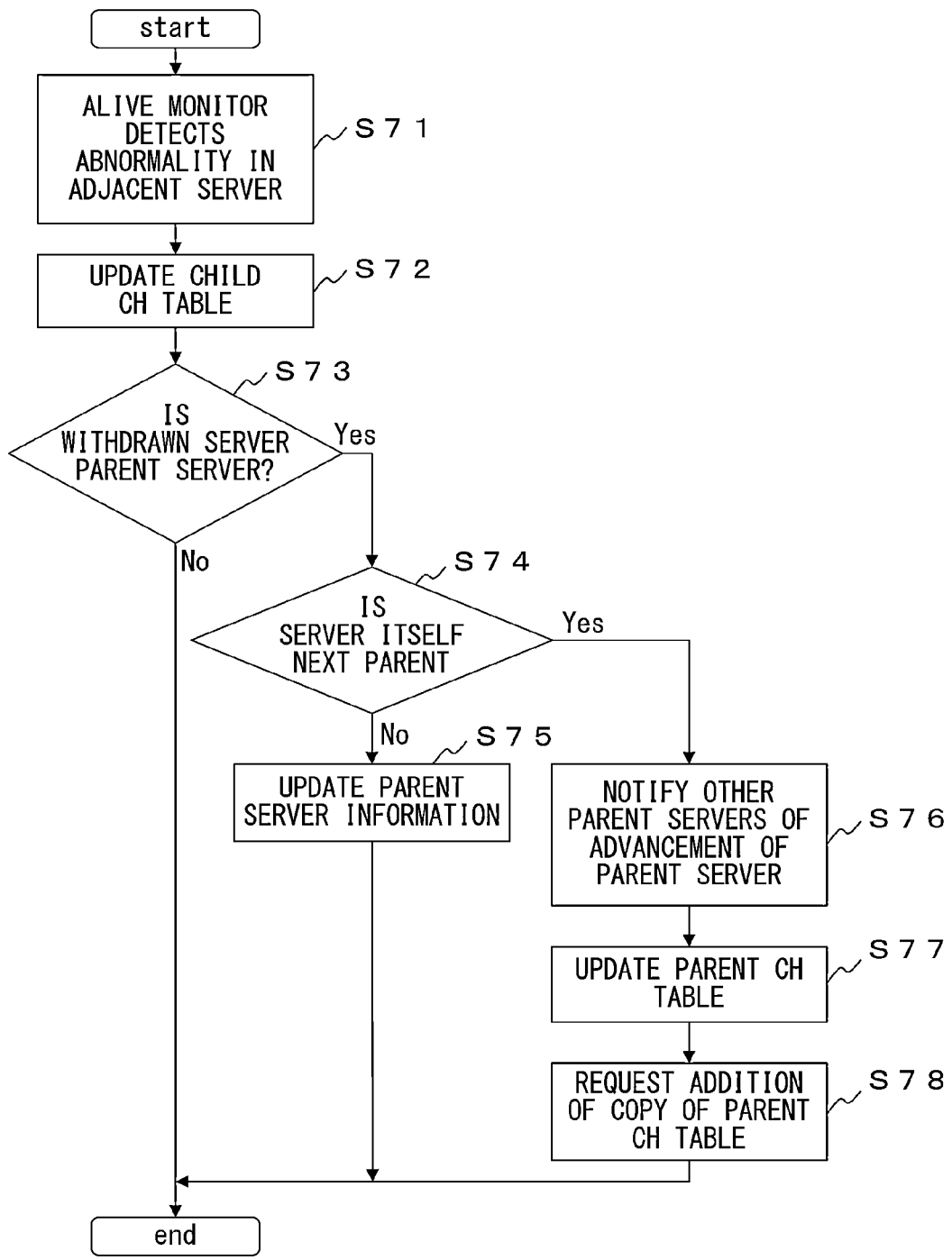
FIG. 19 illustrates a processing flow executed by each server participating in the split hash when a server is withdrawn in this embodiment.

FIG. 19 illustrates a processing flow executed by each of the servers participating in the split hash when a server is withdrawn in this embodiment. This flow is executed by each of the servers participating in the split hash. Each server stores, in the storage 48, information for determining whether the server itself is a parent server or a child server and information for identifying the parent server in the area.

The server alive monitor 47 detects withdrawal of any of the servers participating in the split hash from the split hash (S71). The server (target server) having detected the withdrawal of the server from the split hash deletes the server information structure of the withdrawn server from the child CH table 50 of the target server, and updates the address information 1 and the address information 2 to reform the link, thus reconstructing the child CH table 50 (S72).

When it is determined that the withdrawn server is a child server on the basis of information stored in the storage 48 of the target server ("No" in S73), the target server finishes this flow.

When it is determined that the withdrawn server is a parent server on the basis of the information stored in the storage 48 of the target server ("Yes" in S73), the target server determines whether the server itself is the next parent or not. Here, the target server makes it possible to determine whether the server itself is the next parent or not by comparing the hash value of the target server with the maximum hash value of the server in the current area.

When the target server determines that the server itself is the next parent ("Yes" in S74), the target server notifies each parent server 12 of advancement to the parent server using the parent CH table 49 preliminarily copied and stored in the storage 48 (S76). The target server updates "server identifier" 72, "hash value" 73, and "destination information" 74 in the server information structure of the withdrawn parent server in the parent CH table 49 with the "server identifier", "hash value", and "destination information" of the server itself (S77). Furthermore, the target server transmits a copy of the updated parent CH table 49 to the child server having a next higher hash value in the area (S78). The child server stores the copy of the parent CH table in the storage 48.

When the target server determines that the server itself is not the next parent ("No" in S74), the target server updates information for identifying the parent server in the area, on the basis of the information notified by another server (S76), and finishes the flow (S75).

(Example of Dynamic Change of Split Hash Space)

Finally, a flow of accessing the distributed system constructed in this embodiment will be described in brief. First, the client 31 searches the parent CH table 49, and accesses the parent server 12. Thus, a destination is always secured where the key and data notified to the parent server 12 are to be stored in the area concerned. The parent server 12 has the destination information of every server in the area to which the parent server itself belongs. Accordingly, this parent server is able to reach the target server by one hop. As described above, in the case where division is made in a nesting (layered) manner, the servers managed by the parent server are a group of parent servers at one layer below. In this case, further one hop is needed to reach the destination. However, provided that the number of pieces of destination information that is possible to be managed by one server is N (N: any integer), an overlay network is constructed that is capable of searching with an amount of information of $\Sigma N$ and with 0 to n hops in the case of the server configuration including $N^n$ servers (n: any integer).

In this embodiment, the server having the highest hash value among the servers belonging to the area is designated as the parent server. However, the configuration is not limited thereto. Instead, the server having the lowest hash value among the servers belonging to the area may be designated as the parent server.

Figure 20:
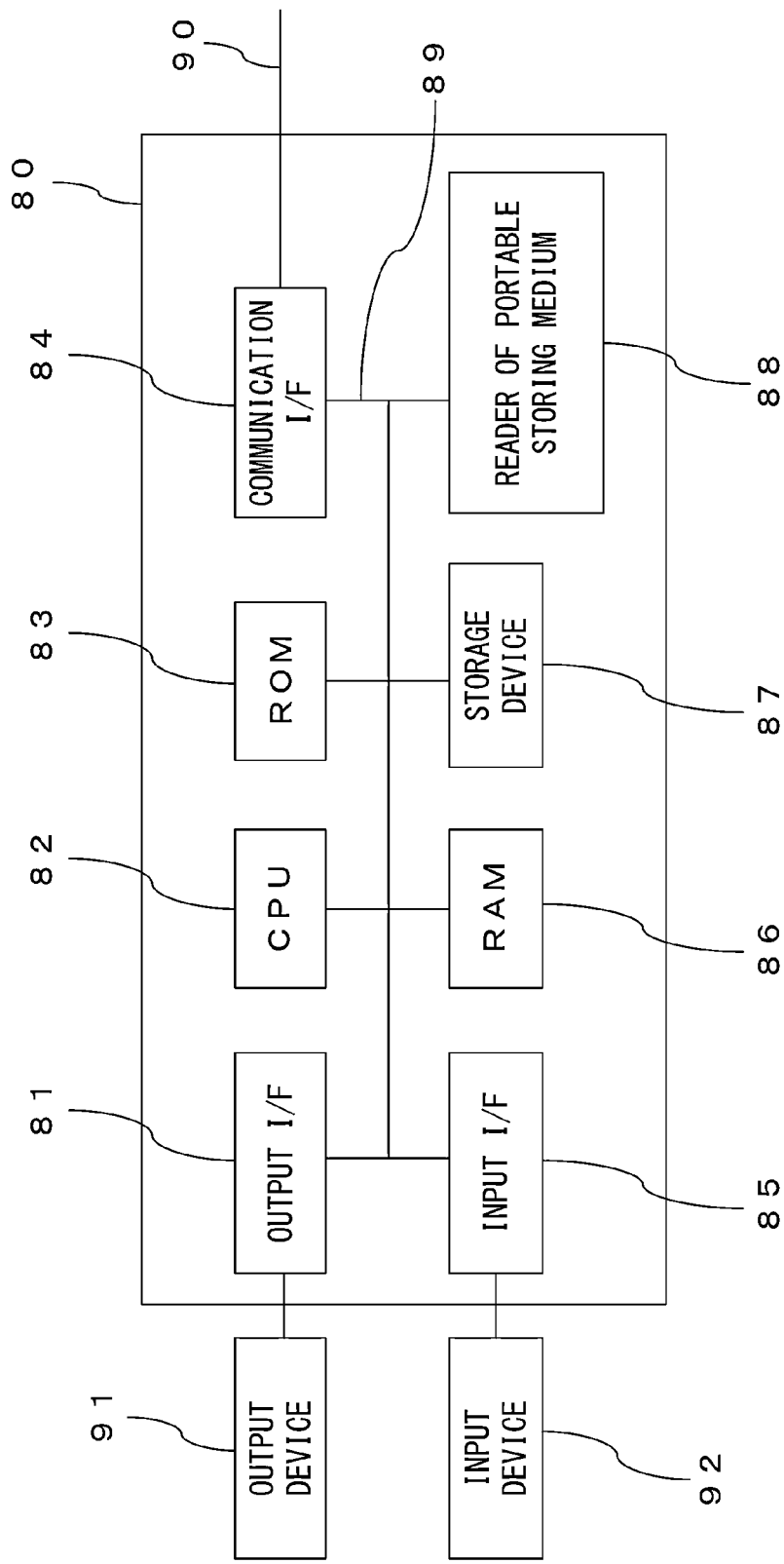
FIG. 20 is a configurational block diagram of a hardware environment of a computer according to an example of this embodiment.

FIG. 20 is a configurational block diagram of a hardware environment of a computer according to an example of this embodiment. A computer 80 is capable to be used as the parent server 12, the child server 13, or the client 31.

The computer 80 includes an output I/F 81, a CPU 82, a ROM 83, a communication I/F 84, an input I/F 85, a RAM 86, a storage device 87, a reader 88, and a bus 89. The computer 80 is connected to an output device 91 and an input device 92.

Here, the CPU, which stands for a central processing unit, is an example of a processor. The ROM stands for a read only memory. The RAM stands for a random access memory. The I/F stands for an interface. The output I/F 81, the CPU 82, the ROM 83, the communication I/F 84, the input I/F 85, the RAM 86, the storage device 87, and the reader 88 are connected to the bus 89. The reader 88 is a device for reading portable recording medium. The output device 91 is connected to the output I/F 81. The input device 92 is connected to the input I/F 85.

The storage device 87 may be any type of storage devices, such as a hard disk drive, a flash memory device, and a magnetic disk device. The storage device 87 or the ROM 83 stores, for instance, a program for achieving the process described in this embodiment.

In the case where the computer 80 is the parent server 12, the storage device 87 or the ROM 83 stores the parent CH table 49, the child CH table 50 in the area to which the parent server 12 belongs, the server management information 65, the upper limit of the number of servers in an area and the like. In the case where the computer 80 is the child server 13, the storage device 87 or the ROM 83 stores the child CH table 50 in the area concerned, the server management information 65, the upper limit of the number of servers in an area and the like. In the case where the computer 80 is the client 31, the storage device 87 or the ROM 83 stores the parent CH table and the like.

The CPU 82 reads the program stored in the storage device 87 or the ROM 83 for achieving the processes described in this embodiment, and executes the program.

The program achieving the processes described in this embodiment may be provided by a program provider and stored in, for instance, the storage device 87 via the communication network 90 and the communication I/F 84. The program achieving the processes described in this embodiment may be stored in a portable storage medium that is on the market and distributed. In this case, the portable storage medium may be set into the reader 88, and then the program thereon may read by the CPU 82 and executed. The portable storage medium may be any of various types of storage media, such as a CD-ROM, a flexible disk, an optical disk, a magneto-optical disk, an IC card, and a USB memory device. The program stored in such a storage medium is read by the reader 88.

The input device 92 may be a keyboard, a mouse, an electronic camera, a web camera, a microphone, a scanner, a sensor, a tablet, a touch panel or the like. The output device 91 may be a display, a printer, a speaker, or the like. The network 90 may be the Internet, a LAN, a WAN, a dedicated line, a wireless or wired communication network or the like.

According to an aspect of the present invention, in a system including information processing devices capable of communicating with each other, the load of controlling and maintaining the network is reduced.

This embodiment is not limited to the aforementioned embodiments. Various configurations or modes may be adopted within a range without departing from the gist of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device that is any of a plurality of information processing devices to be connected in a manner capable of mutually communicating via a communication network, each of the plurality of information processing devices having any of hash values associated with a hash space based on distribution hash information providing the hash values according to a distributed hashing method, the information processing device comprising:
   a storing unit that stores first distribution hash information and second distribution hash information, the plurality of information processing devices being divided into a plurality of groups according to the hash values associated with the hash space, the first distribution hash information representing distribution hash information relying on a hash value in the hash space of a first device that is any of the plurality of information processing devices belonging to any of the plurality of groups, the second distribution hash information representing distribution hash information relying on a hash value in the hash space of one or more second devices that are an information processing devices belonging to a group to which the first device belongs; and
   a processor executing a process including:
      acquiring access information for requesting access to a target information processing device from among the plurality of information processing devices, the access information being transmitted from a client device or another information processing device on the basis of the first distribution hash information stored by the client device or the another information processing device, the access information including a first hash value generated using a hash function from an identifier identifying each of the plurality of information processing devices;
      extracting the first hash value from the access information;
      searching the second distribution hash information for the one or more second devices corresponding to the extracted first hash value;
      transmitting the access information to a retrieved second device by the searching;
      when a participation request to a first group to which the first device belongs is issued from the information processing device that does not belong to any of the groups, comparing the number of the one or more second devices belonging to the first group with a prescribed threshold;
      selecting a second device of the one or more second devices according to a result of the comparison;
      separating, from the first group, one or more second devices having the hash value included in a range from a starting point of the hash space corresponding to the first group to the hash value of the selected second device;

generating the second distribution hash information pertaining to the group formed by the separated one or more second devices; and adding the selected second device to the first distribution hash information.

2. The information processing device according to claim 1, wherein;

when the information processing device is the first device, the storing unit stores the second distribution hash information and the first distribution hash information; and when the acquired access information is access information to be processed by an other first device, the processor searches the first distribution hash information for the other first device corresponding to the hash value generated from the access information and transmits the access information to the other retrieved first device by the searching.

3. The information processing device according to claim 1, wherein the process further includes:

when the first device is withdrawn from the communication network and when the information processing device is a second device has a hash value next higher or lower to the withdrawn first device among the second devices belonging to the group to which the withdrawn first device belongs, notifying the other information processing device that the second device having the hash value next higher or lower to the withdrawn first device is a first device in the group;

adding the second device having the hash value next higher or lower to the withdrawn first device to the first distribution hash information; and transmitting the added first distribution hash information to at least one of the other information processing device and an information processing terminal.

4. A non-transitory computer-readable recording medium having stored therein a program for causing an information processing device to execute a process, the information processing device being any of a plurality of information processing devices to be connected in a manner capable of mutually communicating via a communication network, each of the plurality of information processing devices having any of hash values associated with a hash space based on distribution hash information providing the hash values according to a distributed hashing method, the process comprising:

acquiring access information for requesting access to a target information processing device from among the plurality of information processing devices, the information processing device storing first distribution hash information and second distribution hash information, the plurality of information processing devices being divided into a plurality of groups according to the hash values associated with the hash space, the first distribution hash information representing distribution hash information relying on a hash value in the hash space of a first device that is any of the plurality of information processing devices belonging to any of the plurality of groups, the second distribution hash information representing distribution hash information relying on a hash value in the hash space of one or more second devices that are an information processing devices belonging to a group to which the first device belongs, the access information being transmitted from a client device or another information device on the basis of the first distribution hash information stored by the client device or the another information processing device, the access information including a first hash value generated using a hash function from an identifier identifying each of the plurality of information processing devices;

extracting the first hash value from the access information;

searching the second distribution hash information for the one or more second devices corresponding to the extracted first hash value; and transmitting the access information to a retrieved second device by the searching;

when a participation request to a first group to which the first device belongs is issued from the information processing device that does not belong to any of the groups, comparing the number of the one or more second devices belonging to the first group with a prescribed threshold;

selecting a second device of the one or more second devices according to a result of the comparison;

separating, from the first group, one or more second devices having the hash value included in a range from a starting point of the hash space corresponding to the first group to the hash value of the selected second device;

generating the second distribution hash information pertaining to the group formed by the separated one or more second devices; and adding the selected second device to the first distribution hash information.

5. An information search method of accessing a target information processing device of a plurality of information processing devices in an information processing system including the plurality of information processing devices being connected in a manner capable of communicating with each other via a communication network, each of the plurality of information processing devices having any of hash values associated with a hash space based on distribution hash information providing the hash values according to a distributed hashing method, the information search method comprising:

acquiring, by an information processing device among the plurality of information processing devices, access information for requesting access to the target information processing device from among the plurality of information processing devices, the any information processing device storing first distribution hash information and second distribution hash information, the plurality of information processing devices being divided into a plurality of groups according to the hash values associated with the hash space, the first distribution hash information representing distribution hash information relying on a hash value in the hash space of a first device that is any of the plurality of information processing devices belonging to any of the plurality of groups, the second distribution hash information representing distribution hash information relying on a hash value in the hash space of one or more second devices that are an information processing devices belonging to a group to which the first device belongs, the access information being transmitted from a client device or another information device on the basis of the first distribution hash information stored by the client device or the another information processing device, the access information including a first hash value generated using a hash function from an identifier identifying each of the plurality of information processing devices;

extracting, by the information processing device, the first hash value from the access information;

searching, by the information processing device that acquires the access information, the second distribution hash information for the one or more second devices corresponding to the extracted first hash value, and transmitting, by the information processing device that acquires the access information, the access information to a retrieved second device by the searching;

when a participation request to a first group to which the first device belongs is issued from the information processing device that does not belong to any of the groups, comparing, by the information processing device that acquires the access information, the number of the one or more second devices belonging to the first group with a prescribed threshold;

selecting, by the information processing device that acquires the access information, a second device of the one or more second devices according to a result of the comparison;

separating, by the information processing device that acquires the access information, from the first group, one or more second devices having the hash value included in a range from a starting point of the hash space corresponding to the first group to the hash value of the selected second device;

generating, by the information processing device that acquires the access information, the second distribution hash information pertaining to the group formed by the separated one or more second devices; and adding, by the information processing device that acquires the access information, the selected second device to the first distribution hash information.

* * * * *